US011695458B2

(12) United States Patent
Wernersson et al.

(10) Patent No.: US 11,695,458 B2
(45) Date of Patent: *Jul. 4, 2023

(54) POWER CONTROL FOR NEW RADIO UPLINK SINGLE-USER MULTIPLE-INPUT-MULTIPLE-OUTPUT COMMUNICATION

(71) Applicant: TELEFONAKTIEBOLAGET LM ERICSSON (PUBL), Stockholm (SE)

(72) Inventors: Niklas Wernersson, Kungsängen (SE); Robert Mark Harrison, Grapevine, TX (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/653,402

(22) Filed: Oct. 15, 2019

(65) Prior Publication Data

US 2020/0044706 A1 Feb. 6, 2020

Related U.S. Application Data

(63) Continuation of application No. 16/257,538, filed on Jan. 25, 2019, now Pat. No. 10,476,567, which is a (Continued)

(51) Int. Cl.
*H04B 7/0456* (2017.01)
*H04W 72/044* (2023.01)
(Continued)

(52) U.S. Cl.
CPC ......... *H04B 7/0486* (2013.01); *H04B 7/0626* (2013.01); *H04B 7/0639* (2013.01);
(Continued)

(58) Field of Classification Search
CPC .. H04B 7/0404; H04B 7/0413; H04B 7/0456; H04B 7/0486; H04B 7/0626;
(Continued)

(56) References Cited

U.S. PATENT DOCUMENTS 11,418,240 B2 * 8/2022 Harrison ............... H01Q 21/24
2011/0013615 A1 1/2011 Lee et al.
(Continued)

FOREIGN PATENT DOCUMENTS

JP 2013524584 A 6/2013
RU 2509450 C2 3/2014
(Continued)

OTHER PUBLICATIONS

3GPP TS 38.213 V15.1.0 (Mar. 2018), 3rd Generation Partnership Project; Technical Specification Group Radio Access Network; NR; Physical layer procedures for control (Release 15).*
(Continued)

*Primary Examiner* — Kan Yuen

(57) ABSTRACT

Systems and methods are disclosed herein for determining a power to be used for a set of antenna ports for a physical uplink shared channel transmission. In some embodiments, a User Equipment (UE) comprises processing circuitry configured to derive a power P to be used for uplink power control for a physical uplink shared channel transmission and determine a power to be used for a set of antenna ports based on the power P according to a rule that depends on whether the UE is utilizing codebook based transmission or non-codebook based transmission for the physical uplink shared channel transmission. The set of antenna ports is antenna ports on which the physical uplink shared channel transmission is transmitted with non-zero power.

16 Claims, 12 Drawing Sheets

Related U.S. Application Data continuation of application No. PCT/IB2019/050075, filed on Jan. 4, 2019.

(60) Provisional application No. 62/654,286, filed on Apr. 6, 2018.

(51) Int. Cl.
| | | |
|---|---|---|
| *H04B 7/06* | (2006.01) | |
| *H04L 5/00* | (2006.01) | |
| *H04W 52/14* | (2009.01) | |
| *H04L 25/02* | (2006.01) | |

(52) U.S. Cl.
CPC ........ *H04L 5/0048* (2013.01); *H04L 25/0226* (2013.01); *H04W 52/146* (2013.01); *H04W 72/0473* (2013.01)

(58) Field of Classification Search
CPC . H04B 7/0628; H04B 7/0639; H04L 25/0226; H04L 5/0048; H04W 52/16; H04W 52/30; H04W 52/34; H04W 52/146; H04W 52/327; H04W 52/545; H04W 52/325; H04W 52/42; H04W 72/042; H04W 72/0473
See application file for complete search history.

(56) References Cited

U.S. PATENT DOCUMENTS

| | | | | |
|---|---|---|---|---|
| 2011/0243007 A1* | 10/2011 | Xiao | ..................... | H04W 52/52 370/252 |
| 2011/0310994 A1* | 12/2011 | Ko | ..................... | H04B 7/0639 375/295 |
| 2013/0128833 A1 | 5/2013 | Lee et al. | | |
| 2016/0353424 A1 | 12/2016 | Stirling-Gallacher et al. | | |
| 2016/0359647 A1 | 12/2016 | Chen et al. | | |
| 2017/0094610 A1 | 3/2017 | Lee et al. | | |
| 2018/0183503 A1* | 6/2018 | Rahman | ............... | H04W 72/042 |
| 2018/0242308 A1* | 8/2018 | Ko | ........................ | H04B 7/0626 |
| 2019/0140729 A1* | 5/2019 | Zhang | .................. | H04B 7/0669 |
| 2019/0182001 A1* | 6/2019 | Lee | ..................... | H04W 52/325 |
| 2020/0083939 A1* | 3/2020 | Park | ..................... | H04B 7/0404 |

FOREIGN PATENT DOCUMENTS

| | | |
|---|---|---|
| RU | 2573742 C2 | 1/2016 |
| WO | 20111204371 A1 | 10/2011 |
| WO | 2018031869 A1 | 2/2018 |

OTHER PUBLICATIONS

CATT, "Discussion on remaining details of codebook based UL transmission", 3GPP TSG RAN WG1 Meeting 91, R1-1720178, Nov. 27-Dec. 1, 2017.

Ericsson, "Power control for UL MIMO", 3GPP TSG RAN WG1 Meeting 92bis, R1-1805205, Apr. 16-20, 2018.

CATT, "Remaining issues on PT-RS", 3GPP TSG RAN WG1 Meeting #92, Athens, Greece, Feb. 26-Mar. 2, 2018, pp. 1-7, R1-1801725, 3GPP.

OPPO, Remaining issues on uplink non-codebook transmission [online], 3GPP TSG RAN WG1 Meeting #91 R1-179965, 3GPP, Nov. 18, 2017, https://www.3gpp.org/ftp/tsg_ran/WG1_RL1/TSGR1_86b/Docs/R1-179965.zip.

* cited by examiner

*IMPLEMENTATION #1*

IMPLEMENTATION #2

IMPLEMENTATION #3

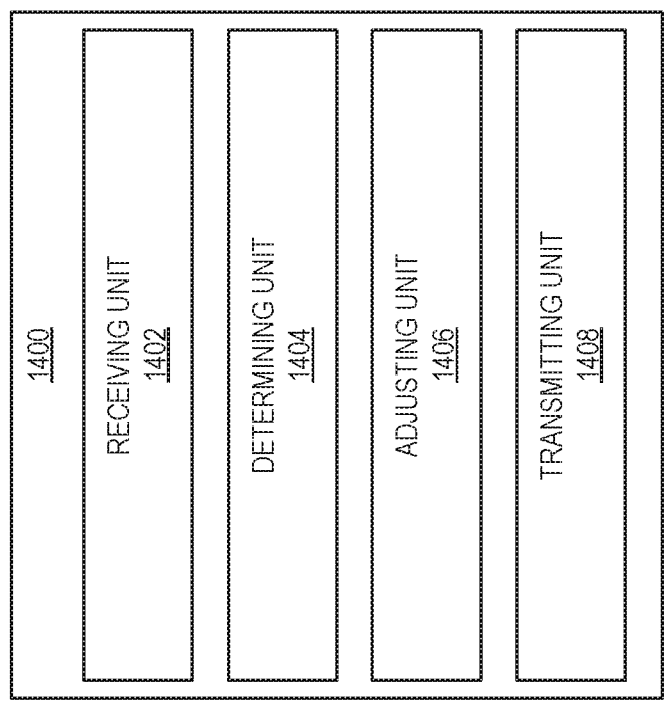

POWER CONTROL FOR NEW RADIO UPLINK SINGLE-USER MULTIPLE-INPUT-MULTIPLE-OUTPUT COMMUNICATION

RELATED APPLICATIONS

This application is a continuation application of U.S. patent application Ser. No. 16/257,538, filed Jan. 25, 2019, which is a continuation application of International Patent Application No. PCT/IB2019/050075, filed Jan. 4, 2019, which claims the benefit of provisional patent application Ser. No. 62/654,286, filed Apr. 6, 2018, the disclosure of which are hereby incorporated herein by reference in their entirety.

TECHNICAL FIELD

The disclosed subject matter relates generally to telecommunications. Certain embodiments relate more particularly to concepts such as New Radio (NR), uplink (UL) power control, non-codebook based precoding, codebook based precoding, and single-user Multiple-Input-Multiple-Output (MIMO) communication.

BACKGROUND

The next generation mobile wireless communication system (Fifth Generation (5G)), or New Radio (NR), will support a diverse set of use cases and a diverse set of deployment scenarios. The latter includes deployment at both low frequencies, i.e., 100s of Megahertz (MHz), similar to Long Term Evolution (LTE) today, and very high frequencies, i.e., millimeter (mm) waves in the tens of Gigahertz (GHz).

Codebook-Based Precoding

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

The NR standard is currently being specified. A core component in NR is the support of MIMO antenna deployments and MIMO related techniques. NR will support uplink MIMO with at least 4 layer spatial multiplexing using at least 4 antenna ports with channel dependent precoding. The spatial multiplexing mode is aimed for high data rates in favorable channel conditions. An illustration of the spatial multiplexing operation is provided in FIG. 1 for where Cyclic Prefix Orthogonal Frequency Division Multiplexing (CP-OFDM) is used on the uplink (UL).

As seen, the information carrying symbol vector s is multiplied by an $N_T \times r$ precoder matrix W, which serves to distribute the transmit energy in a subspace of the $N_T$ (corresponding to $N_T$ antenna ports) dimensional vector space. The precoder matrix is typically selected from a codebook of possible precoder matrices, and is typically indicated by means of a Transmit Precoder Matrix Indicator (TPMI), which specifies a unique precoder matrix in the codebook for a given number of symbol streams. The r symbols in s each correspond to a layer and r is referred to as the transmission rank. In this way, spatial multiplexing is achieved since multiple symbols can be transmitted simultaneously over the same Time/Frequency Resource Element (TFRE). The number of symbols r is typically adapted to suit the current channel properties.

The received $N_R \times 1$ vector yn for a certain TFRE on subcarrier n (or alternatively data TFRE number n) is thus modeled by $$y_n = H_n W s_n + e_n$$

where $e_n$ is a noise/interference vector obtained as realizations of a random process. The precoder W can be a wideband precoder, which is constant over frequency, or frequency selective.

The precoder matrix W is often chosen to match the characteristics of the $N_R \times N_T$ MIMO channel matrix $H_n$, resulting in so-called channel dependent precoding. This is also commonly referred to as closed-loop precoding and essentially strives for focusing the transmit energy into a subspace which is strong in the sense of conveying much of the transmitted energy to the User Equipment device (UE). In addition, the precoder matrix may also be selected to strive for orthogonalizing the channel, meaning that after proper linear equalization at the UE, the inter-layer interference is reduced.

One example method for a UE to select a precoder matrix W can be to select the $W_k$ that maximizes the Frobenius norm of the hypothesized equivalent channel:

$$\max_k \| \hat{H}_n W_k \|_F^2$$

where
$\hat{H}_n$ is a channel estimate, possibly derived from SRS.
$W_k$ is a hypothesized precoder matrix with index k.
$\hat{H}_n W_k$ is the hypothesized equivalent channel.

In closed-loop precoding for the NR uplink, the Transmission Reception Point (TRP) transmits, based on channel measurements in the reverse link (UL), TPMI to the UE that the UE should use on its UL antennas. The NR base station (gNB) configures the UE to transmit Sounding Reference Signal (SRS) according to the number of UE antennas it would like the UE to use for UL transmission to enable the channel measurements. A single precoder that is supposed to cover a large bandwidth (wideband precoding) may be signaled.

Other information than TPMI is generally used to determine the UL MIMO transmission state, such as SRS Resource Indicators (SRIs) as well as Transmission Rank Indicators (TRIs). These parameters, as well as the Modulation and Coding State (MCS), and the UL resources where Physical Uplink Shared Channel (PUSCH) is to be transmitted, are also determined by channel measurements derived from SRS transmissions from the UE. The transmission rank, and thus the number of spatially multiplexed layers, is reflected in the number of columns of the precoder W. For efficient performance, it is important that a transmission rank that matches the channel properties is selected.

SRS Transmission in NR

SRSs are used for a variety of purposes in LTE, and are expected to serve similar purposes in NR. One primary use for SRS is for UL channel state estimation, allowing channel quality estimation to enable UL link adaptation (including determination of which MCS state the UE should transmit with) and/or frequency-selective scheduling. In the context of UL MIMO, they can also be used to determine precoders and a number of layers that will provide good UL throughput and/or Signal to Interference plus Noise Ratio (SINR) when the UE uses them for transmission on its UL antenna array. Additional uses include power control and UL timing advance adjustment.

Unlike LTE Release 14, at least some NR UEs may be capable of transmitting multiple SRS resources. This is similar conceptually to multiple Channel State Information Reference Signal (CSI-RS) resources on the downlink (DL): an SRS resource comprises one or more SRS ports, and the UE may apply a beamformer and/or a precoder to the SRS ports within the SRS resource such that they are transmitted with the same effective antenna pattern. A primary motivation for defining multiple SRS resources in the UE is to support analog beamforming in the UE where a UE can transmit with a variety of beam patterns, but only one at a time. Such analog beamforming may have relatively high directivity, especially at the higher frequencies that can be supported by NR. Earlier LTE uplink MIMO and transmit diversity designs did not focus on cases where high directivity beamforming could be used on different SRS ports, and so a single SRS resource was sufficient. When an NR UE transmits on different beams, the power received by the TRP can be substantially different. One approach could be to have a single SRS resource, but to indicate to the UE which of its beams to use for transmission. However, since UE antenna designs vary widely among UEs and UE antenna patterns can be highly irregular, it is infeasible to have a predetermined set of UE antenna patterns with which the TRP could control UE UL precoding or beamforming. Therefore, an NR UE may transmit on multiple SRS resources using a distinct effective antenna pattern on each SRS resource, allowing the TRP to determine the composite channel characteristics and quality for the different effective antenna patterns used by the UE. Given this association of each effective antenna pattern with a corresponding SRS resource, the TRP can then indicate to the UE which of one or more effective antenna patterns should be used for transmission on PUSCH (or other physical channels or signals) through one or more SRS resource indicators, or 'SRIs'.

Non-Codebook Based Precoding

NR also supports non-codebook based transmission/precoding for PUSCH in addition to codebook based precoding. For this scheme a set of SRS resources are transmitted where each SRS resource corresponds to one SRS port precoded by some precoder selected by the UE. The gNB can then measure the transmitted SRS resources and feedback to the UE one or multiple SRIs to instruct the UE to perform PUSCH transmission using the precoders corresponding to the referred SRS resources. The rank in this case will be determined from the number of SRIs fed back to the UE.

By configuring the UE with the higher layer parameter SRS-AssocCSIRS and with the higher layer parameter ulTxConfig set to 'NonCodebook', the UE may be configured with a Non-Zero Power (NZP) CSI-RS to utilize reciprocity to create the precoders used for SRS and PUSCH transmission. Hence by measuring on the specified CSI-RS the UE will be able to perform gNB transparent precoding based on reciprocity.

Another mode of operation is to instead let the UE choose the precoders such that each SRS resource corresponds to one UE antenna. Hence, in this case the SRS resource would be transmitted from one UE antenna at the time and the SRIs would hence correspond to different antennas. Thus, by choosing the UE precoders like this the gNB will be able to perform antenna selection at the UE by referring to the different SRIs which in turn will correspond to different antennas.

As indicated above, non-codebook based precoding includes both antenna selection and gNB transparent reciprocity based precoding.

UE Coherence Capability in NR

Depending on UE implementation, it may be possible to maintain the relative phase of the transmit chains. In this case, the UE can form an adaptive array by selecting a beam on each transmit chain, and by transmitting the same modulation symbol on the selected beams of both transmit chains using a different gain and/or phase between the transmit chains. This transmission of a common modulation symbol or signal on multiple antenna elements with controlled phase can be labeled 'coherent' transmission'. The support for coherent uplink MIMO transmission in LTE Release 10 is indicated via a feature group indication for relative transmit phase continuity for UL spatial multiplexing, wherein a UE indicates if it can adequately maintain the relative phase of transmit chains over time in order to support coherent transmission.

In other UE implementations, the relative phase of the transmit chains may not be well controlled, and coherent transmission may not be used. In such implementations, it may still be possible to transmit on one of the transmit chains at a time, or to transmit different modulation symbols on the transmit chains. In the latter case, the modulation symbols on each transmit chain may form a spatially multiplexed, or 'MIMO', layer. This class of transmission may be referred to as 'non-coherent' transmission. Such non-coherent transmission schemes may be used by LTE Release 10 UEs with multiple transmit chains, but that do not support relative transmit phase continuity.

In still other UE implementations, the relative phase of a subset of the transmit chains is well controlled, but not over all transmit chains. One possible such example would be multi-panel operation, where phase is well controlled among transmit chains within a panel, but phase between panels is not well controlled. This class of transmission may be referred to as 'partially-coherent'.

All three of these variants of relative phase control have been agreed for support in NR, and so UE capabilities have been defined for full coherence, partial coherence, and non-coherent transmission. Full coherence, partial coherence, and non-coherent UE capabilities are identified according to the terminology of Third Generation Partnership Project (3GPP) Technical Specification (TS) 38.331 Version 15.0.1 as 'fullAndPartialAndNonCoherent', 'partialCoherent', and 'nonCoherent', respectively. This terminology is used because a UE supporting fully coherent transmission is also capable of supporting partial and non-coherent transmission and because a UE supporting partially coherent transmission is also capable of supporting and non-coherent transmission. A UE can then be configured to transmit using a subset of the UL MIMO codebook that can be supported with its coherence capability. In 38.214 section 6.1.1, the UE can be configured with higher layer parameter ULCodebookSubset, which can have values 'fullAndPartialAndNonCoherent', 'partialAndNonCoherent', and 'nonCoherent', indicating that the UE uses subsets of a codebook that can be supported by UEs with fully coherent, partially coherent, and non-coherent transmit chains.

Antenna Ports

In TS 38.211 V15.0.0 section 6.3.1.5, the vector z corresponding to the antenna ports is specified for codebook based and non-codebook based precoding as follows:

The block of vectors $[y^{(0)}(i) \ldots y^{(v-1)}(i)]^T$, $i=0, 1, \ldots, M_{symb}^{layer}-1$ shall be precoded according to $$\begin{bmatrix} z^{(p_0)}(i) \\ \vdots \\ z^{(p_{\rho-1})}(i) \end{bmatrix} = W \begin{bmatrix} y^{(0)}(i) \\ \vdots \\ y^{(v-1)}(i) \end{bmatrix}$$

where i=0, 1, . . . , $M_{symb}^{ab}-1$, $M_{symb}^{ap}=M_{symb}^{layer}$. The set of antenna ports $\{p_0, \ldots, p_{\rho-1}\}$ shall be determined according to the procedure in [6, TS 38.214].

For non-codebook-based transmission, the precoding matrix w equals the identity matrix.

For codebook-based transmission, the precoding matrix w is given by w=1 for single-layer transmission on a single antenna port, otherwise by Tables 6.3.1.5-1 to 6.3.1.5-7 with the TPMI index obtained from the DCI scheduling the uplink transmission.

UL Power Control

Setting Output Power Levels of Transmitters, Base Stations in DL, and Mobile stations in UL in mobile systems is commonly referred to as Power Control (PC). Objectives of PC include improved capacity, coverage, improved system robustness, and reduced power consumption.

In LTE, PC mechanisms can be categorized into the groups (i) open-loop, (ii) closed-loop, and (iii) combined open- and closed loop. These differ in what input is used to determine the transmit power. In the open-loop case, the transmitter measures some signal sent from the receiver, and sets its output power based on this. In the closed-loop case, the receiver measures the signal from the transmitter, and based on this sends a Transmit Power Control (TPC) command to the transmitter, which then sets its transmit power accordingly. In a combined open- and closed-loop scheme, both inputs are used to set the transmit power.

In systems with multiple channels between the terminals and the base stations, e.g. traffic and control channels, different power control principles may be applied to the different channels. Using different principles yields more freedom in adapting the power control principle to the needs of individual channels. The drawback is increased complexity of maintaining several principles.

Power Control in NR

In TS 38.213 (V15.0.1), the UL power control for NR is specified in section 7 and it is specified how to derive $P_{PUSCH, f, c}(i, j, q_d, l)$ which can be described as the "output" from the UL power control framework; this is the intended output power that should be used by the UE to conduct PUSCH transmission. When performing PUSCH transmission it is specified in TS 38.213 section 7.1 that:

"For PUSCH, a UE first scales a linear value $\hat{P}_{PUSCH, f, c}(i, j, q_d, l)$ of the transmit power $P_{PUSCH, f, c}(i, j, q_d, l)$ on UL BWP b, as described in Subclause 12, of carrier f of serving cell c, with parameters as defined in Subclause 7.1.1, by the ratio of the number of antenna ports with a non-zero PUSCH transmission to the number of configured antenna ports for the transmission scheme. The resulting scaled power is then split equally across the antenna ports on which the non-zero PUSCH is transmitted."

As described herein, the inventors have found that the current UL power control scheme for PUSCH specified for NR has several problems. Solutions for addressing these problems are disclosed herein.

SUMMARY

Systems and methods are disclosed herein for determining, or controlling, a power to be used for a set of antenna ports for a physical uplink shared channel transmission. In some embodiments, a User Equipment (UE) comprises processing circuitry configured to derive a power P to be used for uplink power control for a physical uplink shared channel transmission and determine a power to be used for a set of antenna ports based on the power P according to a rule that depends on whether the UE is utilizing codebook based transmission or non-codebook based transmission for the physical uplink shared channel transmission. The set of antenna ports is antenna ports on which the physical uplink shared channel transmission is transmitted with non-zero power. In some embodiments, the UE further comprises an interface, and the processing circuitry is further configured to transmit, via the interface, the physical uplink shared channel transmission using the set of antenna ports.

In some embodiments, for a case of non-codebook based precoding and reciprocity based transmission, the rule is such that the power P is equally divided across the set of antenna ports on which the physical uplink shared channel transmission is transmitted with non-zero power. In order to determine the power to be used for the set of antenna ports based on the power P in accordance with the rule, the processing circuitry is further configured to equally divide the power P across the set of antenna ports on which the physical uplink shared channel transmission is transmitted with non-zero power. Further, in some embodiments, the rule is such that, for a case of non-codebook based precoding and non-coherent transmission, in order to determine the power to be used for the set of antenna ports based on the power P according to the rule, the processing circuitry is further configured to: derive a second power P' by scaling the power P with a ratio of a number of antenna ports on which the physical uplink shared channel transmission is transmitted with non-zero power to a number of configured antenna ports at the UE; and equally divide the second power P' across the set of antenna ports on which the physical uplink shared channel transmission is transmitted with non-zero power.

In some embodiments, the rule is such that, for a case of codebook based transmission, in order to determine the power to be used for the set of antenna ports based on the power P according to the rule, the processing circuitry is further configured to: derive a second power P' by scaling the power P with a ratio of a number of antenna ports on which the physical uplink shared channel transmission is transmitted with non-zero power to a number of antenna ports at the UE; and equally divide the second power P' across the set of antenna ports on which the physical uplink shared channel transmission is transmitted with non-zero power. In some embodiments, the number of antenna ports at the UE is the number of Sounding Reference Signal (SRS) ports in an SRS resource at the UE.

In some embodiments, the rule is such that, in order to determine the power to be used for the set of antenna ports based on the power P according to the rule, the processing circuitry is further configured to derive a ratio $$\alpha = K \frac{\rho_0}{\rho}$$

where $\rho$ is a number of antenna ports used for the physical uplink shared channel transmission and $\rho_0$ is a number of antenna ports on which the physical uplink shared channel transmission is transmitted with non-zero power. K=1 if the UE has full coherence transmission capability in case of codebook based transmission, K=2 if the UE has partial coherence transmission capability in case of codebook based transmission with four antenna ports, and K=2 or K=4 if the UE has non-coherence transmission capability in case of codebook based transmission and two or four antenna ports, respectively. The rule is further such that, in order to determine the power to be used for the set of antenna ports based on the power P according to the rule, the processing circuitry is further configured to derive a second power P' by scaling the power P with a ratio $\beta=\min\{1, \alpha\}$ and equally divide the second power P' across the set of antenna ports on which the physical uplink shared channel transmission is transmitted with non-zero power. In some embodiments, K=1 if the UE performs non-codebook based transmission.

In some embodiments, the rule is such that, in order to determine the power to be used for the set of antenna ports based on the power P according to the rule, the processing circuitry is further configured to derive a second power P' by scaling the power P with a ratio. The ratio is derived as a function depending on whether the UE is utilizing codebook based transmission or non-codebook based transmission for the physical uplink shared channel transmission and: a capability of the UE in terms of full coherence, partial coherence, or non-coherence transmission; a number of antenna ports, in the set of antenna ports, on which a non-zero physical uplink shared channel is transmitted; a number of antenna ports, in the set of antenna ports, used for the physical uplink shared channel transmission; and/or a number of antenna ports, in the set of antenna ports, at the UE. In some embodiments, the ratio is derived by selecting the ratio from a set of predetermined values. In some embodiments, in order to determine the power to be used for the set of antenna ports based on the power P according to the rule, the processing circuitry is further configured to equally divide the second power P' across the set of antenna ports on which the physical uplink shared channel transmission is transmitted with non-zero power.

In some embodiments, the rule is such that the second power P' may equal the power P for rank 1 transmission for: at least two UE capabilities from a group of UE capabilities consisting of: a capability to perform full coherence transmission, a capability to perform partial coherence transmission, and a capability to perform non-coherence transmission; and/or for both codebook based and non-codebook based transmission.

In some other embodiments, a UE comprises processing circuitry configured to derive a power P to be used for uplink power control for a physical uplink shared channel transmission and determine a power to be used for a set of antenna ports based on the power P according to a rule. The rule depends on a capability of the UE in terms of full coherence, partial coherence, or non-coherence transmission, the set of antenna ports being antenna ports on which the physical uplink shared channel transmission is transmitted with non-zero power. In some embodiments, the UE further comprises an interface, and the processing circuitry is further configured to transmit, via the interface, the physical uplink shared channel transmission using the set of antenna ports.

In some embodiments, the rule is such that, for a case of non-codebook based precoding and reciprocity based transmission, in order to determine the power to be used for the set of antenna ports based on the power P according to the rule, the processing circuitry is further configured to equally divide the power P across the set of antenna ports on which the physical uplink shared channel transmission is transmitted with non-zero power. In some embodiments, the rule is such that, for a case of non-codebook based precoding and non-coherent transmission, in order to determine the power to be used for the set of antenna ports based on the power P according to the rule, the processing circuitry is further configured to: derive a second power P' by scaling the power P with a ratio of a number of antenna ports on which the physical uplink shared channel transmission is transmitted with non-zero power to a number of configured antenna ports at the UE; and equally divide the second power P' across the set of antenna ports on which the physical uplink shared channel transmission is transmitted with non-zero power.

In some embodiments, the rule is such that, for a case of codebook based transmission, in order to determine the power to be used for the set of antenna ports based on the power P according to the rule, the processing circuitry is further configured to: derive a second power P' by scaling the power P with a ratio of a number of antenna ports on which the physical uplink shared channel transmission is transmitted with non-zero power to a number of antenna ports at the UE; and equally divide the second power P' across the set of antenna ports on which the physical uplink shared channel transmission is transmitted with non-zero power. In some embodiments, the number of antenna ports at the UE is the number of SRS ports in an SRS resource at the UE.

In some embodiments, the rule is such that, in order to determine the power to be used for the set of antenna ports based on the power P according to the rule, the processing circuitry is further configured to derive a ratio $$\alpha = K\frac{\rho_0}{\rho}$$

where $\rho$ is a number of antenna ports used for the physical uplink shared channel transmission and $\rho_0$ is a number of antenna ports on which the physical uplink shared channel transmission is transmitted with non-zero power. K=1 if the UE has full coherence transmission capability in case of codebook based transmission, K=2 if the UE has partial coherence transmission capability in case of codebook based transmission with four antenna ports, and K=2 or K=4 if the UE has non-coherence transmission capability in case of codebook based transmission and two or four antenna ports, respectively. The rule is further such that, in order to determine the power to be used for the set of antenna ports based on the power P according to the rule, the processing circuitry is further configured to derive a second power P' by scaling the power P with a ratio $\beta=\min\{1, \alpha\}$ and equally divide the second power P' across the set of antenna ports on which the physical uplink shared channel transmission is transmitted with non-zero power. In some embodiments, K=1 if the UE performs non-codebook based transmission.

In some embodiments, the rule is such that, in order to determine the power to be used for the set of antenna ports based on the power P according to the rule, the processing circuitry is further configured to derive a second power P' by scaling the power P with a ratio. The ratio is derived as a function depending on the capability of the UE in terms of full coherence, partial coherence, or non-coherence transmission and: whether the UE is utilizing codebook based transmission or non-codebook based transmission for the physical uplink shared channel transmission; a number of antenna ports, in the set of antenna ports, on which a non-zero physical uplink shared channel is transmitted; a number of antenna ports, in the set of antenna ports, used for the physical uplink shared channel transmission; and/or a number of antenna ports, in the set of antenna ports, at the UE. In some embodiments, the ratio is derived by selecting the ratio from a set of predetermined values. In some embodiments, in order to determine the power to be used for the set of antenna ports based on the power P according to the rule, the processing circuitry is further configured to equally divide the second power P' across the set of antenna ports on which the physical uplink shared channel transmission is transmitted with non-zero power.

In some embodiments, the rule is such that the second power P' may equal the power P for rank 1 transmission for: at least two UE capabilities from a group of UE capabilities consisting of: a capability to perform full coherence transmission, a capability to perform partial coherence transmission, and a capability to perform non-coherence transmission; and/or for both codebook based and non-codebook based transmission.

Embodiments of a method implemented in a UE are also disclosed. In some embodiments, a method implemented in a UE comprises deriving a power P to be used for uplink power control for a physical uplink shared channel transmission and determining a power to be used for a set of antenna ports based on the power P according to a rule that depends on whether the UE is utilizing codebook based transmission or non-codebook based transmission for the physical uplink shared channel transmission, the set of antenna ports being antenna ports on which the physical uplink shared channel transmission is transmitted with non-zero power. In some embodiments, the method further comprises transmitting the physical uplink shared channel transmission using the set of antenna ports.

In some embodiments, the rule is such that, for a case of non-codebook based precoding and reciprocity based transmission, determining the power to be used for the set of antenna ports based on the power P according to the rule comprises equally dividing the power P across the set of antenna ports on which the physical uplink shared channel transmission is transmitted with non-zero power.

In some embodiments, the rule is such that, for a case of codebook based transmission, determining the power to be used for the set of antenna ports based on the power P according to the rule comprises: deriving a second power P' by scaling the power P with a ratio of a number of antenna ports on which the physical uplink shared channel transmission is transmitted with non-zero power to a number of antenna ports at the UE; and equally dividing the second power P' across the set of antenna ports on which the physical uplink shared channel transmission is transmitted with non-zero power. In some embodiments, the number of antenna ports at the UE is the number of SRS ports in an SRS resource at the UE.

In some embodiments, the rule is such that determining the power to be used for the set of antenna ports based on the power P according to the rule comprises deriving a ratio $$\alpha = K \frac{\rho_0}{\rho}$$

where $\rho$ is a number of antenna ports used for the physical uplink shared channel transmission and $\rho_0$ is a number of antenna ports on which the physical uplink shared channel transmission is transmitted with non-zero power. K=1 if the UE has full coherence transmission capability in case of codebook based transmission, K=2 if the UE has partial coherence transmission capability in case of codebook based transmission with four antenna ports, and K=2 or K=4 if the UE has non-coherence transmission capability in case of codebook based transmission and two or four antenna ports, respectively. The rule is further such that determining the power to be used for the set of antenna ports based on the power P according to the rule further comprises deriving a second power P' by scaling the power P with a ratio $\beta = \min\{1, \alpha\}$ and equally dividing the second power P' across the set of antenna ports on which the physical uplink shared channel transmission is transmitted with non-zero power. In some embodiments, K=1 if the UE performs non-codebook based transmission.

In some embodiments, the rule is such that determining the power to be used for the set of antenna ports based on the power P according to the rule comprises deriving a second power P' by scaling the power P with a ratio, where the ratio is derived as a function depending on whether the UE is utilizing codebook based transmission or non-codebook based transmission for the physical uplink shared channel transmission and: a capability of the UE in terms of full coherence, partial coherence, or non-coherence transmission; a number of antenna ports, in the set of antenna ports, on which a non-zero physical uplink shared channel is transmitted; a number of antenna ports, in the set of antenna ports, used for the physical uplink shared channel transmission; and/or a number of antenna ports, in the set of antenna ports, at the UE. In some embodiments, determining the power to be used for the set of antenna ports based on the power P according to the rule further comprises equally dividing the second power P' across the set of antenna ports on which the physical uplink shared channel transmission is transmitted with non-zero power.

In some embodiments, a method implemented in a UE comprises deriving a power P to be used for uplink power control for a physical uplink shared channel transmission and determining a power to be used for a set of antenna ports based on the power P according to a rule that depends on depends on a capability of the UE in terms of full coherence, partial coherence, or non-coherence transmission, the set of antenna ports being antenna ports on which the physical uplink shared channel transmission is transmitted with non-zero power. In some embodiments, the method further comprises transmitting the physical uplink shared channel transmission using the set of antenna ports.

In some embodiments, the rule is such that, for a case of non-codebook based precoding and reciprocity based transmission, determining the power to be used for the set of antenna ports based on the power P according to the rule comprises equally dividing the power P across the set of antenna ports on which the physical uplink shared channel transmission is transmitted with non-zero power.

In some embodiments, the rule is such that, for a case of codebook based transmission, determining the power to be used for the set of antenna ports based on the power P according to the rule comprises: deriving a second power P' by scaling the power P with a ratio of a number of antenna ports on which the physical uplink shared channel transmission is transmitted with non-zero power to a number of antenna ports at the UE; and equally dividing the second power P' across the set of antenna ports on which the physical uplink shared channel transmission is transmitted with non-zero power. In some embodiments, the number of antenna ports at the UE is the number of SRS ports in an SRS resource at the UE.

In some embodiments, the rule is such that determining the power to be used for the set of antenna ports based on the power P according to the rule comprises deriving a ratio $$\alpha = K \frac{\rho_0}{\rho}$$

where $\rho$ is a number of antenna ports used for the physical uplink shared channel transmission and $\rho_0$ is a number of antenna ports on which the physical uplink shared channel transmission is transmitted with non-zero power. K=1 if the UE has full coherence transmission capability in case of codebook based transmission, K=2 if the UE has partial-coherence transmission capability in case of codebook based transmission with four antenna ports, and K=2 or K=4 if the UE has non-coherence transmission capability in case of codebook based transmission and two or four antenna ports, respectively. The rule is further such that determining the power to be used for the set of antenna ports based on the power P according to the rule further comprises deriving a second power P' by scaling the power P with a ratio $\beta = \min\{1, \alpha\}$ and equally dividing the second power P' across the set of antenna ports on which the physical uplink shared channel transmission is transmitted with non-zero power. In some embodiments, K=1 if the UE performs non-codebook based transmission.

In some embodiments, the rule is such that determining the power to be used for the set of antenna ports based on the power P according to the rule comprises deriving a second power P' by scaling the power P with a ratio, where the ratio is derived as a function depending on the capability of the UE in terms of full coherence, partial coherence, or non-coherence transmission and: whether the UE is utilizing codebook based transmission or non-codebook based transmission for the physical uplink shared channel transmission; a number of antenna ports, in the set of antenna ports, on which a non-zero physical uplink shared channel is transmitted; a number of antenna ports, in the set of antenna ports, used for the physical uplink shared channel transmission; and/or a number of antenna ports, in the set of antenna ports, at the UE. In some embodiments, determining the power to be used for the set of antenna ports based on the power P according to the rule further comprises equally dividing the second power P' across the set of antenna ports on which the physical uplink shared channel transmission is transmitted with non-zero power.

BRIEF DESCRIPTION OF THE DRAWINGS

The drawings illustrate selected embodiments of the disclosed subject matter. In the drawings, like reference labels denote like features.

Figure (FIG. 1 illustrates a transmission structure of precoded spatial multiplexing mode in New Radio (NR).

FIG. 14 illustrates a virtualization apparatus in accordance with some embodiments.

DETAILED DESCRIPTION

Figure 1:
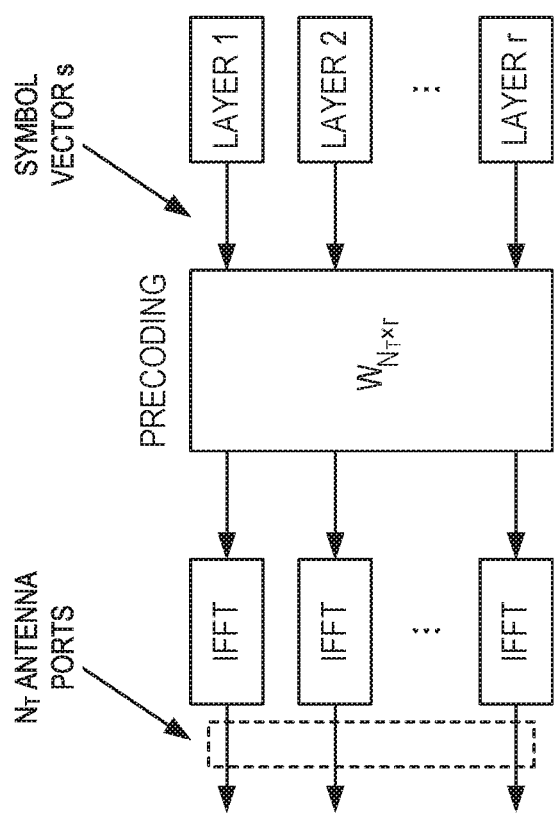

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Additional information may also be found in any document(s) provided in an Appendix hereto.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the description.

Certain concepts may be described herein with reference to particular technology fields or standards and/or using language applicable to those fields and/or standards. For instance, certain embodiments may be described with reference to cells, subframes/slots, channels, etc. as understood in the context of Long Term Evolution (LTE), or with reference to beams, slots/mini-slots, channels, etc. as understood in the context of Third Generation Partnership Project (3GPP) New Radio (NR). Nevertheless, unless otherwise indicated, the described concepts may be more generally applicable and are not to be limited according to any such field, standard, language, etc.

As discussed above, uplink (UL) power control in 3GPP NR is specified in Technical Specification (TS) 38.213 (V15.0.1). In TS 38.213 (V15.0.1), the UL power control for NR is specified in section 7. Section 7 of TS 38.213 (V15.0.1) specifies how to derive $P_{PUSCH,\ f,\ c}(i, j, q_d, l)$, which can be described as the "output" from the UL power control framework. This is the intended output power that should be used by the User Equipment (UE) to conduct Physical Uplink Shared Channel (PUSCH) transmission. When performing PUSCH transmission, TS 38.213 section 7.1 specifies that:

For PUSCH, a UE first scales a linear value $\hat{P}_{PUSCH,\ f,\ c}(i, j, q_d, l)$ of the transmit power $P_{PUSCH,\ f,\ c}(i, j, q_d, l)$ on UL BWP b, as described in Subclause 12, of carrier f of serving cell c, with parameters as defined in Subclause 7.1.1, by the ratio of the number of antenna ports with a non-zero PUSCH transmission to the number of configured antenna ports for the transmission scheme. The resulting scaled power is then split equally across the antenna ports on which the non-zero PUSCH is transmitted."

Figure 2:
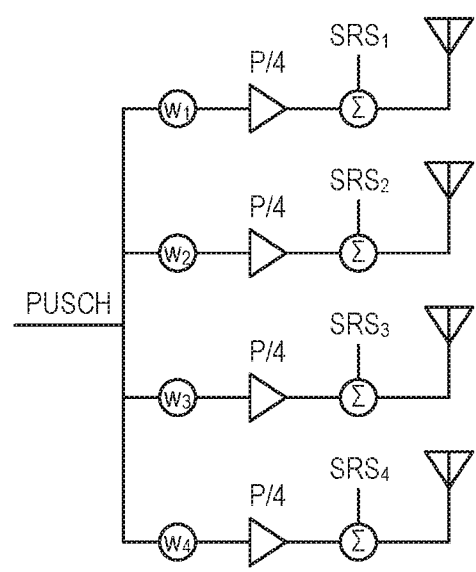
FIG. 2 through FIG. 4 illustrate example User Equipment (UE) implementations.

UL power control for PUSCH as specified in TS 38.213, Section 7.1 (V15.0.1) has several implications. The above power control supports the UE implementation #1 shown in FIG. 2 for codebook based operation, where rank 1 transmission is shown. Each transmit chain only requires a Power Amplifier (PA) capable of one fourth of the total transmit power $\hat{P}_{PUSCH,\ f,\ c}(i, j, q_d, l)$ which is denoted herein as P. Note that each transmit chain in this example is presumed to carry a Sounding Reference Signal (SRS); that is, "non-precoded" SRS is used. Consequently, the NR base station (gNB) can estimate the total power received from all UE transmit chains as the sum of the power on the SRSs.

Three examples are illustrated below for implementation #1 using codebook based precoding. Four antenna ports and rank 1 transmission are considered. Regarding these examples, it is noted that:

The first example "CB, non-coherent" corresponds to a codeword that can be used by UEs with all three different UE capabilities in terms of non-coherent, partially-coherent, and full coherent.

The second example, "CB, partially-coherent", can be used by UEs with partially-coherent and full coherent capability.

The third example, "CB, fully coherent", can be used only by UEs with full coherent capability.

| Example | TPMI | Rank | Precoder (from TS 38.211 v15.0.0) | Effective precoder after power control. | Maximum total transmit power |
|---|---|---|---|---|---|
| CB, non-coherent | TPMI = 0 | 1 | $\frac{1}{2}\begin{bmatrix}1\\0\\0\\0\end{bmatrix}$ | $sqrt(P/4)^* \begin{bmatrix}1\\0\\0\\0\end{bmatrix}$ | P/4 |
| CB, partially-coherent' | TPMI = 4 | 1 | $\frac{1}{2}\begin{bmatrix}1\\0\\1\\0\end{bmatrix}$ | $sqrt(P/4)^* \begin{bmatrix}1\\0\\1\\0\end{bmatrix}$ | P/2 |
| CB, fully coherent | TPMI = 12 | 1 | $\frac{1}{2}\begin{bmatrix}1\\1\\1\\1\end{bmatrix}$ | $sqrt(P/4)^* \begin{bmatrix}1\\1\\1\\1\end{bmatrix}$ | P |

From the above examples, it is noted that, for the case of antenna selection i.e. "CB, non-coherent", only P/4 is transmitted. The reason for this is that the specification states that one should scale the power P "by the ratio of the number of antenna ports with a non-zero PUSCH transmission to the number of configured antenna ports for the transmission scheme". Thus, antenna ports transmitting no power will reduce the total power. Hence, the total power generated by using this precoder will be lower than if the codeword as given by Transmit Precoder Matrix Indicator (TPMI)=12 were used. This property is desirable since it will allow the UE implementation as illustrated above.

Certain embodiments are presented herein in recognition of shortcomings associated with conventional techniques and technologies, such as the following. Current specifications for how to use $P_{PUSCH,\ f,\ c}(i, j, q_d, l)$ when performing a transmission work well for a typical UE layout and codebook based transmission for a UE with full coherence capability. However, the design is not as efficient for non-codebook based transmission and for UEs with other capabilities.

Figure 3:
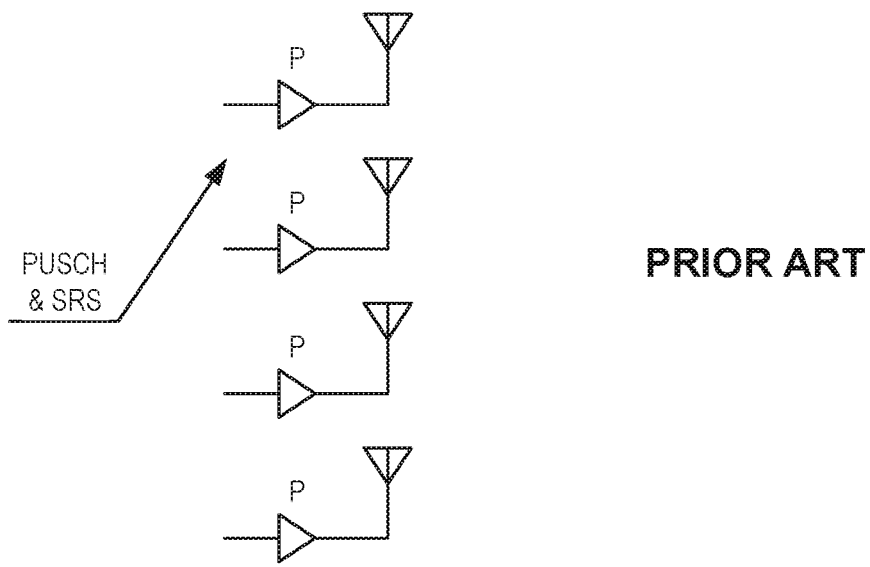
Figure 4:
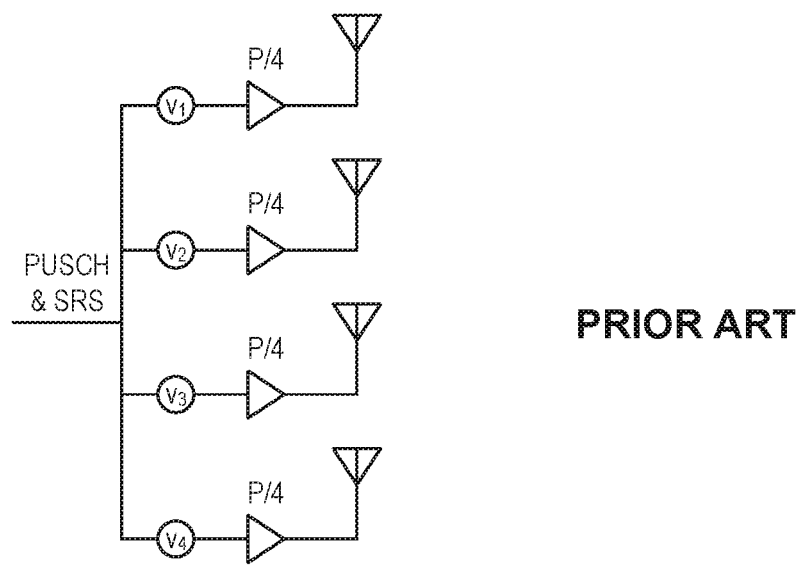

A number of problems will now be described. A first problem (Problem 1) relates to non-codebook based transmission. Consider the two implementations illustrated in FIG. 3 (Implementation #2) and FIG. 4 (Implementation #3) that illustrate non-codebook based transmission.

For implementation #2, corresponding to antenna selection, it is assumed that the first SRS resource is precoded with:

$$\begin{bmatrix}1\\0\\0\\0\end{bmatrix}.$$

This implies that PUSCH will be transmitted as in the table below given that SRS Resource Indicator (SRI)=1 is signaled from the gNB to the UE. Because the number of antenna ports with a Non-Zero Power (NZP) PUSCH transmission is 1 and since four antenna ports are configured for non-codebook based transmission, power control will set the total output power to P/4. This is not beneficial for implementation #2 since it is desirable for UEs to transmit the required maximum power on each transmit chain.

| Case | SRI | Rank | Precoder corresponding to SRS resource 1 | Effective precoder after power control. | Maximum total transmit power |
|---|---|---|---|---|---|
| NCB, antenna selection | 1 | 1 | $\begin{bmatrix}1\\0\\0\\0\end{bmatrix}$ | $sqrt(P/4)^* \begin{bmatrix}1\\0\\0\\0\end{bmatrix}$ | P/4 |

Implementation #3 corresponds to gNB transparent reciprocity based precoding, and so the UE, rather than the gNB, determines the precoder. Therefore, the precoding weights are denoted as $v_i$ instead of as $w_i$ used in implementation #1. Because each $v_i$ can attain any suitable value that the UE selects, possible values of $w_i$ are a subset of those of $v_i$. One possibility is that the first SRS resource is precoded with $$v = \begin{bmatrix} 1 \\ 1 \\ 1 \\ 1 \end{bmatrix}.$$

This implies that PUSCH will be transmitted as below given that SRI=1 is signaled from the gNB to the UE. While the number of antennas transmitting is four, the number of antenna ports with a non-zero PUSCH transmission is still 1 as in the above example. Further, since four antenna ports are configured for non-codebook based transmission, power control will set the output power in the single transmitting antenna port to P/4, which the means the total output power is again P/4. Hence, although all antennas are used for transmission, the UE will do a power backoff since not all antenna ports are used. This is an undesired behavior since it will decrease the performance of non-cookbook precoding.

| Case | SRI | Rank | Precoder corresponding to SRS resource 1 | Effective precoder after power control. | Maximum total transmit power |
|---|---|---|---|---|---|
| NCB, reciprocity based | 1 | 1 | $\begin{bmatrix} 1 \\ 1 \\ 1 \\ 1 \end{bmatrix}$ | $sqrt(P/16)^* \begin{bmatrix} 1 \\ 1 \\ 1 \\ 1 \end{bmatrix}$ | P/4 |

A second problem (Problem 2) relates to UEs with non-coherent and partial coherence capabilities. If a UE with full coherence capabilities is considered, this UE may transmit as below for codebook based transmission given the current specification:

| Case | TPMI | Rank | Precoder (from TS 38.211 v150.0) | Effective precoder after power control. | Maximum total transmit power |
|---|---|---|---|---|---|
| CB, fully coherent | TPMI = 12 | 1 | $\frac{1}{2} \begin{bmatrix} 1 \\ 1 \\ 1 \\ 1 \end{bmatrix}$ | $sqrt(P/4)^* \begin{bmatrix} 1 \\ 1 \\ 1 \\ 1 \end{bmatrix}$ | P |
| CB, fully coherent, rank2 | TPMI = 15 | 2 | $\frac{1}{2\sqrt{2}} \begin{bmatrix} 1 & 1 \\ 1 & 1 \\ 1 & -1 \\ 1 & -1 \end{bmatrix}$ | $sqrt(P/8) \begin{bmatrix} 1 & 1 \\ 1 & 1 \\ 1 & -1 \\ 1 & -1 \end{bmatrix}$ | P |

Here, it is noted that, when the UE goes up in rank, the power per layer goes down. This is an intended behavior since it enables the UE to choose a lower rank to increase Signal to Noise Ratio (SNR) or alternatively increase rank when the SNR is high.

For a UE with non-coherent capability, the UE may instead transmit as follows:

| Case | TPMI | Rank | Precoder (from TS 38.211 v15.0.0) | Effective precoder after power control. | Maximum total transmit power |
|---|---|---|---|---|---|
| CB, non-coherent | TPMI = 0 | 1 | $\frac{1}{2} \begin{bmatrix} 1 \\ 0 \\ 0 \\ 0 \end{bmatrix}$ | $sqrt(P/4) * \begin{bmatrix} 1 \\ 0 \\ 0 \\ 0 \end{bmatrix}$ | P/4 |
| CB, non-coherent | TPMI = 0 | 2 | $\frac{1}{2} \begin{bmatrix} 1 & 0 \\ 0 & 1 \\ 0 & 0 \\ 0 & 0 \end{bmatrix}$ | $sqrt(P/4) \begin{bmatrix} 1 & 0 \\ 0 & 1 \\ 0 & 0 \\ 0 & 0 \end{bmatrix}$ | P/2 |

Hence, the behavior is the opposite of the desired behavior; the power per layer is constant and lowering rank will hence not increase the SNR. This makes it less appealing for the UE to use a lower rank. Furthermore, although the UE is allowed to transmit with a total power of P, as defined by the UL power control framework, the UE will only do so when using full rank. This is a severe limitation since it implies that when P reaches its maximal possible value P_cmax, the UE will transmit with P_cmax/4. A UE reaching P_cmax is typically a UE corresponding to low SNR and, for such a UE, a low rank transmission with as high power as possible is typically a suitable strategy.

Embodiments are described herein that address the aforementioned problems. In certain embodiments of the disclosed subject matter, new approaches are provided for controlling power (P) for PUSCH transmission. Certain embodiments involve defining a ratio of P that should be transmitted based on, e.g., (i) information about non-codebook based or codebook based transmission, (ii) information about UE capability for coherent transmission, and/or (iii) relying on a number of antenna ports used for PUSCH transmission instead of the number of configured antenna ports.

Certain embodiments of the disclosed subject matter may provide potential benefits compared to conventional techniques and technologies, such as the following examples. Certain embodiments provide efficient transmission for both codebook based precoding as well as non-codebook based precoding. Some such embodiments enable (a) UEs transmitting with non-codebook based reciprocity to utilize full power for rank 1, or (b) UEs with non-coherent and partial coherent capabilities to transmit with full power for rank 1 and also enable the UEs to increase rank at the cost of lower power per layer.

The following description presents several embodiments on PUSCH transmission. The behavior of certain different embodiments in terms of total power is illustrated in Table 1.

Embodiment 1: Split Power Equally Over Used Antenna Ports

In one embodiment, the ratio of the power that should be used is specified in terms of number of ports $\{p_0, \ldots, p_{p-1}\}$ in PUSCH (i.e., the number of antenna ports used for the PUSCH transmission) instead of the number of configured ports. In terms of specification text this may be written as below, based on version 15.0.1 of 3GPP TS 38.213 section 7.1:

For PUSCH, a UE first scales a linear value $\hat{P}_{PUSCH, f, c}(i, j, q_d, l)$ of the transmit power $P_{PUSCH, f, c}(i, j, q_d, l)$ on UL BWP b, as described in Subclause 12, of carrier f of serving cell c, with parameters as defined in Subclause 7.1.1, by the ratio of the number of antenna ports with a non-zero PUSCH transmission to ρ, where ρ is the number of antenna ports $\{p_0, \ldots, p_{p-1}\}$ according to 38.211 6.3.1.5. The resulting scaled power is then split equally across the antenna ports on which the non-zero PUSCH is transmitted.

In some embodiments, when a codebook based mode of operation is used, ρ corresponds to a number of antenna ports over which a precoder in a codebook can apply for PUSCH transmission; while when a non-codebook based mode of operation is used, ρ corresponds to a number of antenna ports and spatial layers on which a PUSCH is transmitted. Hence, for non-codebook transmission, a ratio of 1 that should be divided on the different antenna ports in case of rank 1 transmission is obtained (instead as ¼ as in the current text of 3GPP TS 38.213 V15.0.1).

Embodiment 2: Apply Different Power Splitting Strategies Depending on Transmission Approach In some embodiments, it may be desirable to support UE implementations with N transmit chains having PAs with maximum power P/N (such as implementations #1 and #3). In one such embodiment, P is determined as follows:

In case of codebook based precoding, do as in specification 38.213 V15.0.1 section 7.1.

In case of non-codebook based precoding and non-coherent operation, do as in 38.213 V15.0.1 section 7.1.
  Non-coherent operation may be characterized for non-codebook based operation as when the UE does not calculate precoders using reciprocity. More precisely, the UE using non-codebook based transmission does not measure NZP Channel State Information Reference Signal (CSI-RS) resource to calculate the precoders used for transmission PUSCH and SRS. Such a configuration may be identified as when the UE is configured with higher layer parameter ulTxConfig set to 'NonCodebook' but is not configured with SRS-AssocCSIRS.

In case of non-codebook based precoding and reciprocity based transmission, split the power P equally over the antenna ports $\{p_0, \ldots, p_{p-1}\}$.
  Coherent operation may be characterized for non-codebook based operation as when the UE calculates precoders using reciprocity according to the definition above. Such a configuration may be identified as when the UE is configured with higher layer parameter ulTxConfig set to 'NonCodebook' and is configured with SRS-AssocCSIRS.

This will hence address the problem for the case "NCB, reciprocity based". Potential benefits of this embodiment may include that the total transmitted power for non-codebook based operation with coherent operation increases as compared to the current specification, such that the total power for non-codebook based operation is the same as for codebook based operation for a given number of transmit chains and maximum transmit power per transmit chain in coherent operation.

Embodiment 3

In one embodiment, p is defined as the number of antenna ports $\{p_0, \ldots, p_{p-1}\}$ according to TS 38.211 6.3.1.5. Furthermore, let $\rho_0$ be the number of non-zero antenna ports in $\{p_0, \ldots, p_{p-1}\}$. K is defined such that
  K=1 for UEs with full coherence capability in case of codebook based precoding.
  K=2 for UEs with partial coherence capability in case of codebook based precoding with 4 antenna ports.
  K=2 or K=4 for UEs with non-coherence capability in case of codebook based precoding and 2 or 4 antenna ports, respectively.
  K=1 in case of non-codebook-based precoding.
  From this, a ratio $\alpha = K\rho/\rho_0$ is defined and a scaling factor (β) is derived as $\beta = \min\{1, \alpha\}$. The PUSCH power control is defined as described below in terms of a change to the current language of TS 38.213 V15.0.1 section 7.1:
    For PUSCH, a UE first scales a linear value $\hat{P}_{PUSCH, f, c}(i, j, q_c, l)$ of the transmit power $P_{PUSCH, f, c}(i, j, q_d, l)$ on UL BWP b, as described in Subclause 12, of carrier f of serving cell C, with parameters as defined in Subclause 7.1.1, by β and the resulting scaled power is then split equally across the antenna ports on which the non-zero PUSCH is transmitted.

Some examples of β assuming 2 and 4 configured ports are illustrated below.

| Transmission scheme and UE capability combination | $\rho_0 = 1$ | | $\rho_0 = 2$ | | $\rho_0 = 3$ | $\rho_0 = 4$ |
|---|---|---|---|---|---|---|
| Number of configured ports | 2 ports | 4 ports | 2 ports | 4 ports | 4 ports | 4 ports |
| CB, full coherence | ½ | ¼ | 1 | 2/4 | 3/4 | 1 |
| CB, partial coherence | 1 | ½ | 1 | 1 | 1 | 1 |
| CB, non-coherent | 1 | 1 | 1 | 1 | 1 | 1 |
| NCB | 1 | 1 | 1 | 1 | 1 | 1 |

In some embodiments, K=1 when the UE is configured to transmit PUSCH on a single antenna port, and in other embodiments β=1 when the UE is configured to transmit PUSCH on a single antenna port.

In some embodiments, UEs are configured to use subsets of an UL Multiple-Input-Multiple-Output (MIMO) codebook that are supported by its coherence capability. In such embodiments, the UE can be configured with higher layer parameter ULCodebookSubset, which can have values 'fullAndPartialAndNonCoherent', 'partialAndNonCoherent', and 'nonCoherent', indicating that the UE uses subsets of a codebook that can be supported by UEs with fully coherent, partially coherent, and non-coherent transmit chains. In such embodiments, the use of the codebook subset parameter allows the UE to adjust its power control to match its coherence capability. This behavior may be described as follows:

For PUSCH, a UE first scales a linear value $\hat{P}_{PUSCH, f, c}(i, j, q_d, l)$ of the transmit power $P_{PUSCH, f, c}(i, j, q_d, l)$ on UL BWP b, as described in Subclause 12, of carrier f of serving cell C, with parameters as defined in Subclause 7.1.1, by β and the resulting scaled power is then split equally across the antenna ports on which the non-zero PUSCH is transmitted, where β=1 for single antenna port transmission, and for multi-antenna port transmission:

β=min{1, α} with $$\alpha = K \frac{\rho_0}{\rho}$$

where

ρ is the number of antenna ports $\{p_0, \ldots, p_{\rho-1}\}$ according to TS 38.211 6.3.1.5

$\rho_0$ be the number of non-zero antenna ports in $\{p_0, \ldots, p_{\rho-1}\}$ according to TS 38.211 6.3.1.5.

For non-codebook based transmission K=1. For codebook based transmission K is given from the table below, where ULCodebookSubset is a higher layer parameter.

| ULCodebookSubset | Number of UE antenna ports | K |
|---|---|---|
| fullAndPartialAndNonCoherent | 2 | 1 |
| fullAndPartialAndNonCoherent | 4 | 1 |
| partialCoherent | 4 | 2 |
| nonCoherent | 2 | 2 |
| nonCoherent | 4 | 4 |

Note: the number of configured ports can correspond to the maximum number of spatial layers the UE is capable of transmitting. For codebook based precoding, this can refer to the number of SRS ports in an SRS resource, while for non-codebook based precoding, this can refer to the total number of SRS ports configured to the UE for non-codebook based operation, or it can refer to the total number of SRS ports in an SRS resource set intended for use with codebook based operation.

CB and NCB refer to codebook based and non-codebook based UE capabilities, respectively. Full, partial, and non-coherent UE capabilities may be identified according to the terminology of 3GPP TS 38.331 V15.0.1 as 'fullAndPartialAndNonCoherent', 'partialCoherent', and 'nonCoherent', respectively.

By using β as the ratio of P that should be transmitted on PUSCH, it is noted that for most cases in the table full power will be transmitted. The only cases corresponding to using a lower power corresponds to the cases in codebook based transmission where a gNB has chosen a codeword which structure corresponds to a "lower capability" than the UE's capability; the UE has in this sense an opportunity to turn off some of its branches and thereby reduce power consumption.

The following table illustrates characteristics of certain embodiments discussed above.

TABLE 1

Characteristics of certain embodiments

| | | Maximum total transmit power | | | |
|---|---|---|---|---|---|
| Case | UE capability | Current spec | Emb. 1 | Emb. 2 | Emb. 3 |
| CB, non-coherent | non-coherent | P/4 | P/4 | P/4 | P |
| CB, non-coherent | partially-coherent | P/4 | P/4 | P/4 | P/2 |
| CB, non-coherent | fully coherent | P/4 | P/4 | P/4 | P/4 |
| CB, partially-coherent' | partially-coherent | P/2 | P/2 | P/2 | P |
| CB, partially-coherent' | fully coherent | P/2 | P/2 | P/2 | P/2 |
| CB, fully coherent | fully coherent | P | P | P | P |
| NCB, antenna selection | non-coherent | P/4 | P | P/4 | P |
| NCB, antenna selection | fully coherent | P/4 | P | P/4 | P |
| NCB, reciprocity based | fully coherent | P/4 | P | P | P |

Figure 5:
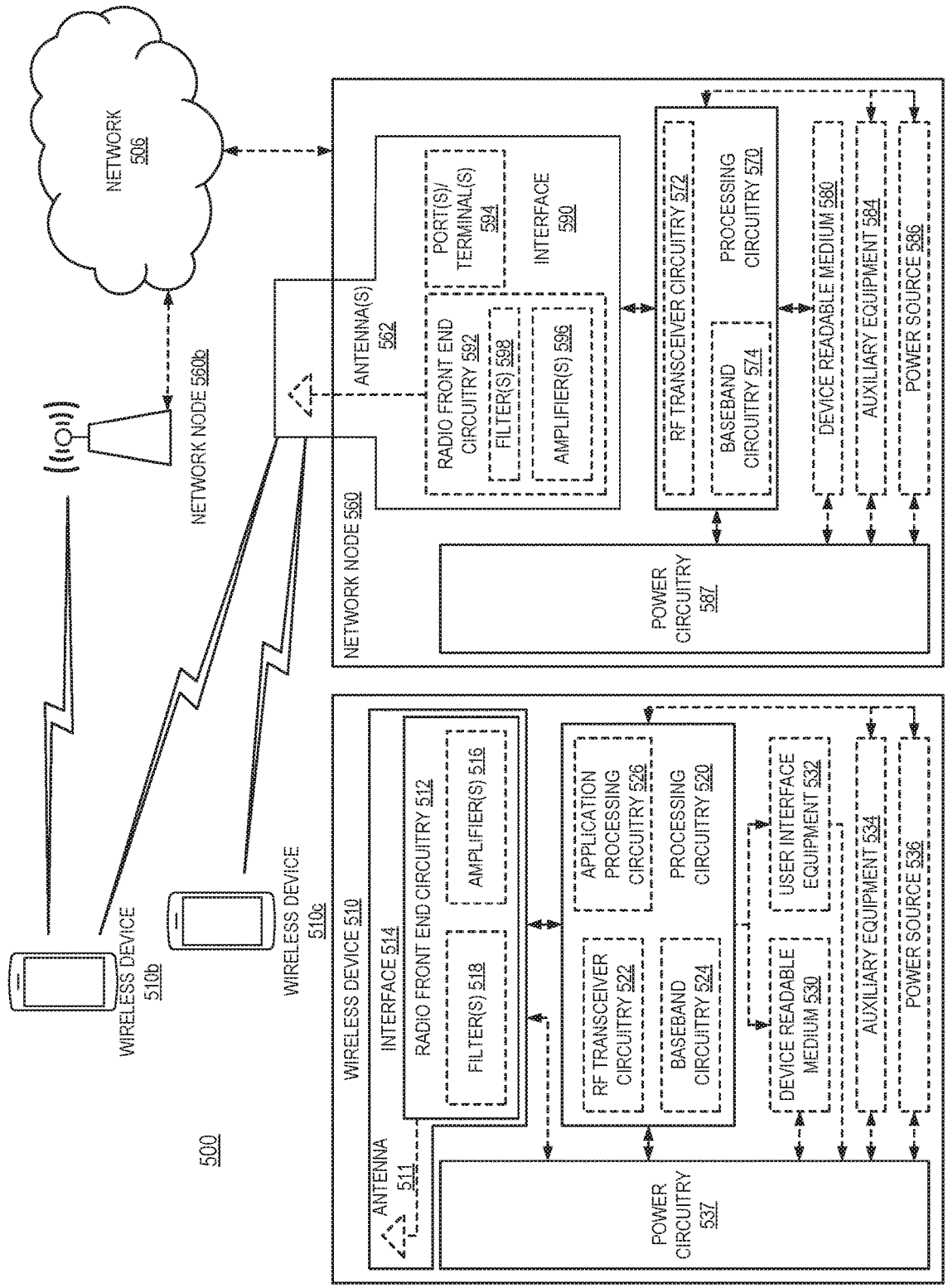
FIG. 5 illustrates a wireless network in accordance with some embodiments.

FIG. 5 illustrates a wireless network in accordance with some embodiments. Although the subject matter described herein may be implemented in any appropriate type of system using any suitable components, the embodiments disclosed herein are described in relation to a wireless network, such as the example wireless network illustrated in FIG. 5. For simplicity, the wireless network of FIG. 5 only depicts network 506, network nodes 560 and 560b, and Wireless Devices (WDs) 510, 510b, and 510c. In practice, a wireless network may further include any additional elements suitable to support communication between wireless devices or between a wireless device and another communication device, such as a landline telephone, a service provider, or any other network node or end device. Of the illustrated components, network node 560 and WD 510 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable Second, Third, Fourth, or Fifth Generation (2G, 3G, 4G, or 5G) standards; Wireless Local Area Network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 506 may comprise one or more backhaul networks, core networks, Internet Protocol (IP) networks, Public Switched Telephone Networks (PSTNs), packet data networks, optical networks, Wide Area Networks (WANs), Local Area Networks (LANs), WLANs, wired networks, wireless networks, metropolitan area networks, and other networks to enable communication between devices.

Network node 560 and WD 510 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged, and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, Access Points (APs) (e.g., radio access points), Base Stations (BSs) (e.g., radio base stations, Node Bs, evolved Node Bs (eNBs) and gNBs). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or Remote Radio Units (RRUs), sometimes referred to as Remote Radio Heads (RRHs). Such RRUs may or may not be integrated with an antenna as an antenna integrated radio. Parts of a distributed radio base station may also be referred to as nodes in a Distributed Antenna System (DAS). Yet further examples of network nodes include Multi-Standard Radio (MSR) equipment such as MSR BSs, network controllers such as Radio Network Controllers (RNCs) or Base Station Controllers (BSCs), Base Transceiver Stations (BTSs), transmission points, transmission nodes, Multi-Cell/Multicast Coordination Entities (MCEs), core network nodes (e.g., MSCs, MMEs), Operation and Maintenance (O&M) nodes, Operations Support System (OSS) nodes, Self Optimized Network (SON) nodes, positioning nodes (e.g., Evolved-Serving Mobile Location Centers (E-SMLCs)), and/or Minimization of Drive Tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 5, network node 560 includes processing circuitry 570, device readable medium 580, interface 590, auxiliary equipment 584, power source 586, power circuitry 587, and antenna 562. Although network node 560 illustrated in the example wireless network of FIG. 5 may represent a device that includes the illustrated combination of hardware components, other embodiments may comprise network nodes with different combinations of components. It is to be understood that a network node comprises any suitable combination of hardware and/or software needed to perform the tasks, features, functions, and methods disclosed herein. Moreover, while the components of network node 560 are depicted as single boxes located within a larger box, or nested within multiple boxes, in practice, a network node may comprise multiple different physical components that make up a single illustrated component (e.g., device readable medium 580 may comprise multiple separate hard drives as well as multiple Random Access Memory (RAM) modules).

Similarly, network node 560 may be composed of multiple physically separate components (e.g., a Node B component and a RNC component, or a BTS component and a BSC component, etc.), which may each have their own respective components. In certain scenarios in which network node 560 comprises multiple separate components (e.g., BTS and BSC components), one or more of the separate components may be shared among several network nodes. For example, a single RNC may control multiple Node Bs. In such a scenario, each unique Node B and RNC pair may in some instances be considered a single separate network node. In some embodiments, network node 560 may be configured to support multiple Radio Access Technologies (RATs). In such embodiments, some components may be duplicated (e.g., separate device readable medium 580 for the different RATs) and some components may be reused (e.g., the same antenna 562 may be shared by the RATs). Network node 560 may also include multiple sets of the various illustrated components for different wireless technologies integrated into network node 560, such as, for example, GSM, Wideband Code Division Multiple Access (WCDMA), LTE, NR, WiFi, or Bluetooth wireless technologies. These wireless technologies may be integrated into the same or different chip or set of chips and other components within network node 560.

Processing circuitry 570 is configured to perform any determining, calculating, or similar operations (e.g., certain obtaining operations) described herein as being provided by a network node. These operations performed by processing circuitry 570 may include processing information obtained by processing circuitry 570 by, for example, converting the obtained information into other information, comparing the obtained information or converted information to information stored in the network node, and/or performing one or more operations based on the obtained information or converted information, and as a result of said processing making a determination.

Processing circuitry 570 may comprise a combination of one or more of a microprocessor, controller, microcontroller, Central Processing Unit (CPU), Digital Signal Processor (DSP), Application Specific Integrated Circuit (ASIC), Field Programmable Gate Array (FPGA), or any other suitable computing device, resource, or combination of hardware, software, and/or encoded logic operable to provide, either alone or in conjunction with other network node 560 components, such as device readable medium 580, network node 560 functionality. For example, processing circuitry 570 may execute instructions stored in device readable medium 580 or in memory within processing circuitry 570. Such functionality may include providing any of the various wireless features, functions, or benefits discussed herein. In some embodiments, processing circuitry 570 may include a System on a Chip (SOC).

In some embodiments, processing circuitry 570 may include one or more of Radio Frequency (RF) transceiver circuitry 572 and baseband processing circuitry 574. In some embodiments, RF transceiver circuitry 572 and baseband processing circuitry 574 may be on separate chips (or sets of chips), boards, or units, such as radio units and digital units. In alternative embodiments, part or all of RF transceiver circuitry 572 and baseband processing circuitry 574 may be on the same chip or set of chips, boards, or units In certain embodiments, some or all of the functionality described herein as being provided by a network node, base station, eNB, or other such network device may be performed by processing circuitry 570 executing instructions stored on device readable medium 580 or memory within processing circuitry 570. In alternative embodiments, some or all of the functionality may be provided by processing circuitry 570 without executing instructions stored on a separate or discrete device readable medium, such as in a hard-wired manner. In any of those embodiments, whether executing instructions stored on a device readable storage medium or not, processing circuitry 570 can be configured to perform the described functionality. The benefits provided by such functionality are not limited to processing circuitry 570 alone or to other components of network node 560, but are enjoyed by network node 560 as a whole, and/or by end users and the wireless network generally.

Device readable medium 580 may comprise any form of volatile or non-volatile computer readable memory including, without limitation, persistent storage, solid-state memory, remotely mounted memory, magnetic media, optical media, RAM, Read Only Memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 570. Device readable medium 580 may store any suitable instructions, data or information, including a computer program, software, an application including one or more of logic, rules, code, tables, etc. and/or other instructions capable of being executed by processing circuitry 570 and, utilized by network node 560. Device readable medium 580 may be used to store any calculations made by processing circuitry 570 and/or any data received via interface 590. In some embodiments, processing circuitry 570 and device readable medium 580 may be considered to be integrated.

Interface 590 is used in the wired or wireless communication of signaling and/or data between network node 560, network 506, and/or WDs 510. As illustrated, interface 590 comprises port(s)/terminal(s) 594 to send and receive data, for example to and from network 506 over a wired connection. Interface 590 also includes radio front end circuitry 592 that may be coupled to, or in certain embodiments a part of, antenna 562. Radio front end circuitry 592 comprises filters 598 and amplifiers 596. Radio front end circuitry 592 may be connected to antenna 562 and processing circuitry 570. Radio front end circuitry may be configured to condition signals communicated between antenna 562 and processing circuitry 570. Radio front end circuitry 592 may receive digital data that is to be sent out to other network nodes or WDs via a wireless connection. Radio front end circuitry 592 may convert the digital data into a radio signal having the appropriate channel and bandwidth parameters using a combination of filters 598 and/or amplifiers 596. The radio signal may then be transmitted via antenna 562. Similarly, when receiving data, antenna 562 may collect radio signals which are then converted into digital data by radio front end circuitry 592. The digital data may be passed to processing circuitry 570. In other embodiments, the interface may comprise different components and/or different combinations of components.

In certain alternative embodiments, network node 560 may not include separate radio front end circuitry 592, instead, processing circuitry 570 may comprise radio front end circuitry and may be connected to antenna 562 without separate radio front end circuitry 592. Similarly, in some embodiments, all or some of RF transceiver circuitry 572 may be considered a part of interface 590. In still other embodiments, interface 590 may include one or more ports or terminals 594, radio front end circuitry 592, and RF transceiver circuitry 572, as part of a radio unit (not shown), and interface 590 may communicate with baseband processing circuitry 574, which is part of a digital unit (not shown).

Antenna 562 may include one or more antennas, or antenna arrays, configured to send and/or receive wireless signals. Antenna 562 may be coupled to radio front end circuitry 590 and may be any type of antenna capable of transmitting and receiving data and/or signals wirelessly. In some embodiments, antenna 562 may comprise one or more omni-directional, sector, or panel antennas operable to transmit/receive radio signals between, for example, 2 gigahertz (GHz) and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 562 may be separate from network node 560 and may be connectable to network node 560 through an interface or port.

Antenna 562, interface 590, and/or processing circuitry 570 may be configured to perform any receiving operations and/or certain obtaining operations described herein as being performed by a network node. Any information, data, and/or signals may be received from a wireless device, another network node, and/or any other network equipment. Similarly, antenna 562, interface 590, and/or processing circuitry 570 may be configured to perform any transmitting operations described herein as being performed by a network node. Any information, data, and/or signals may be transmitted to a wireless device, another network node, and/or any other network equipment.

Power circuitry 587 may comprise, or be coupled to, power management circuitry and is configured to supply the components of network node 560 with power for performing the functionality described herein. Power circuitry 587 may receive power from power source 586. Power source 586 and/or power circuitry 587 may be configured to provide power to the various components of network node 560 in a form suitable for the respective components (e.g., at a voltage and current level needed for each respective component). Power source 586 may either be included in, or external to, power circuitry 587 and/or network node 560. For example, network node 560 may be connectable to an external power source (e.g., an electricity outlet) via an input circuitry or interface such as an electrical cable, whereby the external power source supplies power to power circuitry 587. As a further example, power source 586 may comprise a source of power in the form of a battery or battery pack which is connected to, or integrated in, power circuitry 587. The battery may provide backup power should the external power source fail. Other types of power sources, such as photovoltaic devices, may also be used.

Alternative embodiments of network node 560 may include additional components beyond those shown in FIG. 5 that may be responsible for providing certain aspects of the network node's functionality, including any of the functionality described herein and/or any functionality necessary to support the subject matter described herein. For example, network node 560 may include user interface equipment to allow input of information into network node 560 and to allow output of information from network node 560. This may allow a user to perform diagnostic, maintenance, repair, and other administrative functions for network node 560.

As used herein, WD refers to a device capable, configured, arranged, and/or operable to communicate wirelessly with network nodes and/or other wireless devices. Unless otherwise noted, the term WD may be used interchangeably herein with UE. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a Voice over IP (VoIP) phone, a wireless local loop phone, a desktop computer, a Personal Digital Assistant (PDA), a wireless camera, a gaming console or device, a music storage device, a playback appliance, a wearable terminal device, a wireless endpoint, a mobile station, a tablet, a laptop, a Laptop Embedded Equipment (LEE), a Laptop-Mounted Equipment (LME), a smart device, a wireless Customer Premise Equipment (CPE), a vehicle-mounted wireless terminal device, etc. A WD may support Device-to-Device (D2D) communication, for example by implementing a 3GPP standard for sidelink communication, Vehicle-to-Vehicle (V2V), Vehicle-to-Infrastructure (V2I), Vehicle-to-Everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a Machine-to-Machine (M2M) device, which may in a 3GPP context be referred to as a Machine Type Communication (MTC) device. As one particular example, the WD may be a UE implementing the 3GPP Narrowband IoT (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 510 includes antenna 511, interface 514, processing circuitry 520, device readable medium 530, user interface equipment 532, auxiliary equipment 534, power source 536, and power circuitry 537. WD 510 may include multiple sets of one or more of the illustrated components for different wireless technologies supported by WD 510, such as, for example, GSM, WCDMA, LTE, NR, WiFi, WiMAX, or Bluetooth wireless technologies, just to mention a few. These wireless technologies may be integrated into the same or different chips or set of chips as other components within WD 510.

Antenna 511 may include one or more antennas or antenna arrays, configured to send and/or receive wireless signals, and is connected to interface 514. In certain alternative embodiments, antenna 511 may be separate from WD 510 and be connectable to WD 510 through an interface or port. Antenna 511, interface 514, and/or processing circuitry 520 may be configured to perform any receiving or transmitting operations described herein as being performed by a WD. Any information, data, and/or signals may be received from a network node and/or another WD. In some embodiments, radio front end circuitry, and/or antenna 511 may be considered an interface.

As illustrated, interface 514 comprises radio front end circuitry 512 and antenna 511. Radio front end circuitry 512 comprises one or more filters 518 and amplifiers 516. Radio front end circuitry 514 is connected to antenna 511 and processing circuitry 520, and is configured to condition signals communicated between antenna 511 and processing circuitry 520. Radio front end circuitry 512 may be coupled to or a part of antenna 511. In some embodiments, WD 510 may not include separate radio front end circuitry 512; rather, processing circuitry 520 may comprise radio front end circuitry and may be connected to antenna 511. Similarly, in some embodiments, some or all of RF transceiver circuitry 522 may be considered a part of interface 514. Radio front end circuitry 512 may receive digital data that is to be sent out to other network nodes or WDs via a wireless connection. Radio front end circuitry 512 may convert the digital data into a radio signal having the appropriate channel and bandwidth parameters using a combination of filters 518 and/or amplifiers 516. The radio signal may then be transmitted via antenna 511. Similarly, when receiving data, antenna 511 may collect radio signals which are then converted into digital data by radio front end circuitry 512. The digital data may be passed to processing circuitry 520. In other embodiments, the interface may comprise different components and/or different combinations of components.

Processing circuitry 520 may comprise a combination of one or more of a microprocessor, controller, microcontroller, CPU, DSP, ASIC, FPGA, or any other suitable computing device, resource, or combination of hardware, software, and/or encoded logic operable to provide, either alone or in conjunction with other WD 510 components, such as device readable medium 530, WD 510 functionality. Such functionality may include providing any of the various wireless features or benefits discussed herein. For example, processing circuitry 520 may execute instructions stored in device readable medium 530 or in memory within processing circuitry 520 to provide the functionality disclosed herein.

As illustrated, processing circuitry 520 includes one or more of RF transceiver circuitry 522, baseband processing circuitry 524, and application processing circuitry 526. In other embodiments, the processing circuitry may comprise different components and/or different combinations of components. In certain embodiments processing circuitry 520 of WD 510 may comprise a SOC. In some embodiments, RF transceiver circuitry 522, baseband processing circuitry 524, and application processing circuitry 526 may be on separate chips or sets of chips. In alternative embodiments, part or all of baseband processing circuitry 524 and application processing circuitry 526 may be combined into one chip or set of chips, and RF transceiver circuitry 522 may be on a separate chip or set of chips. In still alternative embodiments, part or all of RF transceiver circuitry 522 and baseband processing circuitry 524 may be on the same chip or set of chips, and application processing circuitry 526 may be on a separate chip or set of chips. In yet other alternative embodiments, part or all of RF transceiver circuitry 522, baseband processing circuitry 524, and application processing circuitry 526 may be combined in the same chip or set of chips. In some embodiments, RF transceiver circuitry 522 may be a part of interface 514. RF transceiver circuitry 522 may condition RF signals for processing circuitry 520.

In certain embodiments, some or all of the functionality described herein as being performed by a WD may be provided by processing circuitry 520 executing instructions stored on device readable medium 530, which in certain embodiments may be a computer-readable storage medium. In alternative embodiments, some or all of the functionality may be provided by processing circuitry 520 without executing instructions stored on a separate or discrete device readable storage medium, such as in a hard-wired manner. In any of those particular embodiments, whether executing instructions stored on a device readable storage medium or not, processing circuitry 520 can be configured to perform the described functionality. The benefits provided by such functionality are not limited to processing circuitry 520 alone or to other components of WD 510, but are enjoyed by WD 510 as a whole, and/or by end users and the wireless network generally.

Processing circuitry 520 may be configured to perform any determining, calculating, or similar operations (e.g., certain obtaining operations) described herein as being performed by a WD. These operations, as performed by processing circuitry 520, may include processing information obtained by processing circuitry 520 by, for example, converting the obtained information into other information, comparing the obtained information or converted information to information stored by WD 510, and/or performing one or more operations based on the obtained information or converted information, and as a result of said processing making a determination.

Device readable medium 530 may be operable to store a computer program, software, an application including one or more of logic, rules, code, tables, etc. and/or other instructions capable of being executed by processing circuitry 520. Device readable medium 530 may include computer memory (e.g., RAM or ROM), mass storage media (e.g., a hard disk), removable storage media (e.g., a CD or a DVD), and/or any other volatile or non-volatile, non-transitory device readable and/or computer executable memory devices that store information, data, and/or instructions that may be used by processing circuitry 520. In some embodiments, processing circuitry 520 and device readable medium 530 may be considered to be integrated.

User interface equipment 532 may provide components that allow for a human user to interact with WD 510. Such interaction may be of many forms, such as visual, audial, tactile, etc. User interface equipment 532 may be operable to produce output to the user and to allow the user to provide input to WD 510. The type of interaction may vary depending on the type of user interface equipment 532 installed in WD 510. For example, if WD 510 is a smart phone, the interaction may be via a touch screen; if WD 510 is a smart meter, the interaction may be through a screen that provides usage (e.g., the number of gallons used) or a speaker that provides an audible alert (e.g., if smoke is detected). User interface equipment 532 may include input interfaces, devices and circuits, and output interfaces, devices and circuits. User interface equipment 532 is configured to allow input of information into WD 510, and is connected to processing circuitry 520 to allow processing circuitry 520 to process the input information. User interface equipment 532 may include, for example, a microphone, a proximity or other sensor, keys/buttons, a touch display, one or more cameras, a Universal Serial Bus (USB) port, or other input circuitry. User interface equipment 532 is also configured to allow output of information from WD 510, and to allow processing circuitry 520 to output information from WD 510. User interface equipment 532 may include, for example, a speaker, a display, vibrating circuitry, a USB port, a headphone interface, or other output circuitry. Using one or more input and output interfaces, devices, and circuits, of user interface equipment 532, WD 510 may communicate with end users and/or the wireless network, and allow them to benefit from the functionality described herein.

Auxiliary equipment 534 is operable to provide more specific functionality which may not be generally performed by WDs. This may comprise specialized sensors for doing measurements for various purposes, interfaces for additional types of communication such as wired communications etc. The inclusion and type of components of auxiliary equipment 534 may vary depending on the embodiment and/or scenario.

Power source 536 may, in some embodiments, be in the form of a battery or battery pack. Other types of power sources, such as an external power source (e.g., an electricity outlet), photovoltaic devices or power cells, may also be used. WD 510 may further comprise power circuitry 537 for delivering power from power source 536 to the various parts of WD 510 which need power from power source 536 to carry out any functionality described or indicated herein. Power circuitry 537 may in certain embodiments comprise power management circuitry. Power circuitry 537 may additionally or alternatively be operable to receive power from an external power source; in which case WD 510 may be connectable to the external power source (such as an electricity outlet) via input circuitry or an interface such as an electrical power cable. Power circuitry 537 may also in certain embodiments be operable to deliver power from an external power source to power source 536. This may be, for example, for the charging of power source 536. Power circuitry 537 may perform any formatting, converting, or other modification to the power from power source 536 to make the power suitable for the respective components of WD 510 to which power is supplied.

Figure 6:
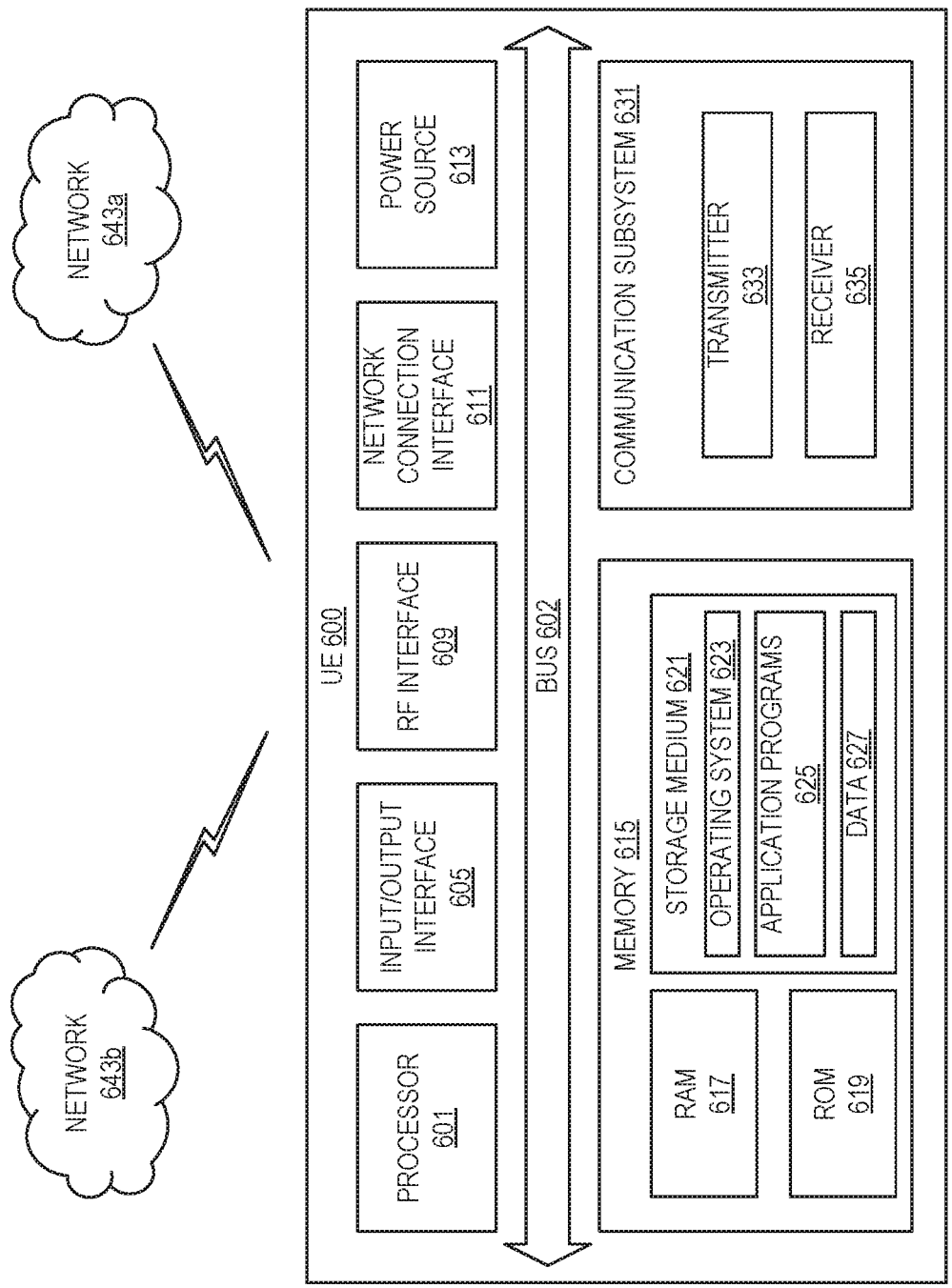
FIG. 6 illustrates a UE in accordance with some embodiments.

FIG. 6 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 600 may be any UE identified by the 3GPP, including a NB-IoT UE, a MTC UE, and/or an enhanced MTC (eMTC) UE. UE 600, as illustrated in FIG. 6, is one example of a WD configured for communication in accordance with one or more communication standards promulgated by the 3GPP, such as 3GPP's GSM, UMTS, LTE, and/or 5G standards. As mentioned previously, the term WD and UE may be used interchangeably. Accordingly, although FIG. 6 is a UE, the components discussed herein are equally applicable to a WD, and vice-versa.

In FIG. 6, UE 600 includes processing circuitry 601 that is operatively coupled to input/output interface 605, RF interface 609, network connection interface 611, memory 615 including RAM 617, ROM 619, and storage medium 621 or the like, communication subsystem 631, power source 633, and/or any other component, or any combination thereof. Storage medium 621 includes operating system 623, application program 625, and data 627. In other embodiments, storage medium 621 may include other similar types of information. Certain UEs may utilize all of the components shown in FIG. 6, or only a subset of the components. The level of integration between the components may vary from one UE to another UE. Further, certain UEs may contain multiple instances of a component, such as multiple processors, memories, transceivers, transmitters, receivers, etc.

In FIG. 6, processing circuitry 601 may be configured to process computer instructions and data. Processing circuitry 601 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or DSP, together with appropriate software; or any combination of the above. For example, the processing circuitry 601 may include two CPUs. Data may be information in a form suitable for use by a computer.

In the depicted embodiment, input/output interface 605 may be configured to provide a communication interface to an input device, output device, or input and output device. UE 600 may be configured to use an output device via input/output interface 605. An output device may use the same type of interface port as an input device. For example, a USB port may be used to provide input to and output from UE 600. The output device may be a speaker, a sound card, a video card, a display, a monitor, a printer, an actuator, an emitter, a smartcard, another output device, or any combination thereof. UE 600 may be configured to use an input device via input/output interface 605 to allow a user to capture information into UE 600. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 6, RF interface 609 may be configured to provide a communication interface to RF components such as a transmitter, a receiver, and an antenna. Network connection interface 611 may be configured to provide a communication interface to network 643a. Network 643a may encompass wired and/or wireless networks such as a LAN, a WAN, a computer network, a wireless network, a telecommunications network, another like network, or any combination thereof. For example, network 643a may comprise a WiFi network. Network connection interface 611 may be configured to include a receiver and a transmitter interface used to communicate with one or more other devices over a communication network according to one or more communication protocols, such as Ethernet, Transmission Control Protocol (TCP)/IP, Synchronous Optical Networking (SONET), Asynchronous Transfer Mode (ATM), or the like. Network connection interface 611 may implement receiver and transmitter functionality appropriate to the communication network links (e.g., optical, electrical, and the like). The transmitter and receiver functions may share circuit components, software, or firmware, or alternatively may be implemented separately.

RAM 617 may be configured to interface via bus 602 to processing circuitry 601 to provide storage or caching of data or computer instructions during the execution of software programs such as the operating system, application programs, and device drivers. ROM 619 may be configured to provide computer instructions or data to processing circuitry 601. For example, ROM 619 may be configured to store invariant low-level system code or data for basic system functions such as basic input and output (I/O), startup, or reception of keystrokes from a keyboard that are stored in a non-volatile memory. Storage medium 621 may be configured to include memory such as RAM, ROM, Programmable ROM (PROM), Erasable PROM (EPROM), Electrically EPROM (EEPROM), magnetic disks, optical disks, floppy disks, hard disks, removable cartridges, or flash drives. In one example, storage medium 621 may be configured to include operating system 623, application program 625 such as a web browser application, a widget or gadget engine or another application, and data file 627. Storage medium 621 may store, for use by UE 600, any of a variety of various operating systems or combinations of operating systems.

Storage medium 621 may be configured to include a number of physical drive units, such as Redundant Array of Independent Disks (RAID), floppy disk drive, flash memory, USB flash drive, external hard disk drive, thumb drive, pen drive, key drive, High-Density Digital Versatile Disc (HD-DVD) optical disc drive, internal hard disk drive, Blu-Ray optical disc drive, Holographic Digital Data Storage (HDDS) optical disc drive, external mini-Dual In-Line Memory Module (DIMM), Synchronous Dynamic RAM (SDRAM), external micro-DIMM SDRAM, smartcard memory such as a Subscriber Identity Module (SIM) or a Removable User Identity (RUIM) module, other memory, or any combination thereof. Storage medium 621 may allow UE 600 to access computer-executable instructions, application programs or the like, stored on transitory or non-transitory memory media, to off-load data, or to upload data. An article of manufacture, such as one utilizing a communication system may be tangibly embodied in storage medium 621, which may comprise a device readable medium.

In FIG. 6, processing circuitry 601 may be configured to communicate with network 643b using communication subsystem 631. Network 643a and network 643b may be the same network or networks or different network or networks. Communication subsystem 631 may be configured to include one or more transceivers used to communicate with network 643b. For example, communication subsystem 631 may be configured to include one or more transceivers used to communicate with one or more remote transceivers of another device capable of wireless communication such as another WD, UE, or base station of a radio access network (RAN) according to one or more communication protocols, such as IEEE 802.2, Code Division Multiple Access (CDMA), WCDMA, GSM, LTE, Universal Terrestrial RAN (UTRAN), WiMax, or the like. Each transceiver may include transmitter 633 and/or receiver 635 to implement transmitter or receiver functionality, respectively, appropriate to the RAN links (e.g., frequency allocations and the like). Further, transmitter 633 and receiver 635 of each transceiver may share circuit components, software, or firmware, or alternatively may be implemented separately.

In the illustrated embodiment, the communication functions of communication subsystem 631 may include data communication, voice communication, multimedia communication, short-range communications such as Bluetooth, near-field communication, location-based communication such as the use of the Global Positioning System (GPS) to determine a location, another like communication function, or any combination thereof. For example, communication subsystem 631 may include cellular communication, WiFi communication, Bluetooth communication, and GPS communication. Network 643b may encompass wired and/or wireless networks such as a LAN, a WAN, a computer network, a wireless network, a telecommunications network, another like network or any combination thereof. For example, network 643b may be a cellular network, a WiFi network, and/or a near-field network. Power source 613 may be configured to provide Alternating Current (AC) or Direct Current (DC) power to components of UE 600.

The features, benefits, and/or functions described herein may be implemented in one of the components of UE 600 or partitioned across multiple components of UE 600. Further, the features, benefits, and/or functions described herein may be implemented in any combination of hardware, software, or firmware. In one example, communication subsystem 631 may be configured to include any of the components described herein. Further, processing circuitry 601 may be configured to communicate with any of such components over bus 602. In another example, any of such components may be represented by program instructions stored in memory that when executed by processing circuitry 601 perform the corresponding functions described herein. In another example, the functionality of any of such components may be partitioned between processing circuitry 601 and communication subsystem 631. In another example, the non-computationally intensive functions of any of such components may be implemented in software or firmware and the computationally intensive functions may be implemented in hardware.

Figure 7:
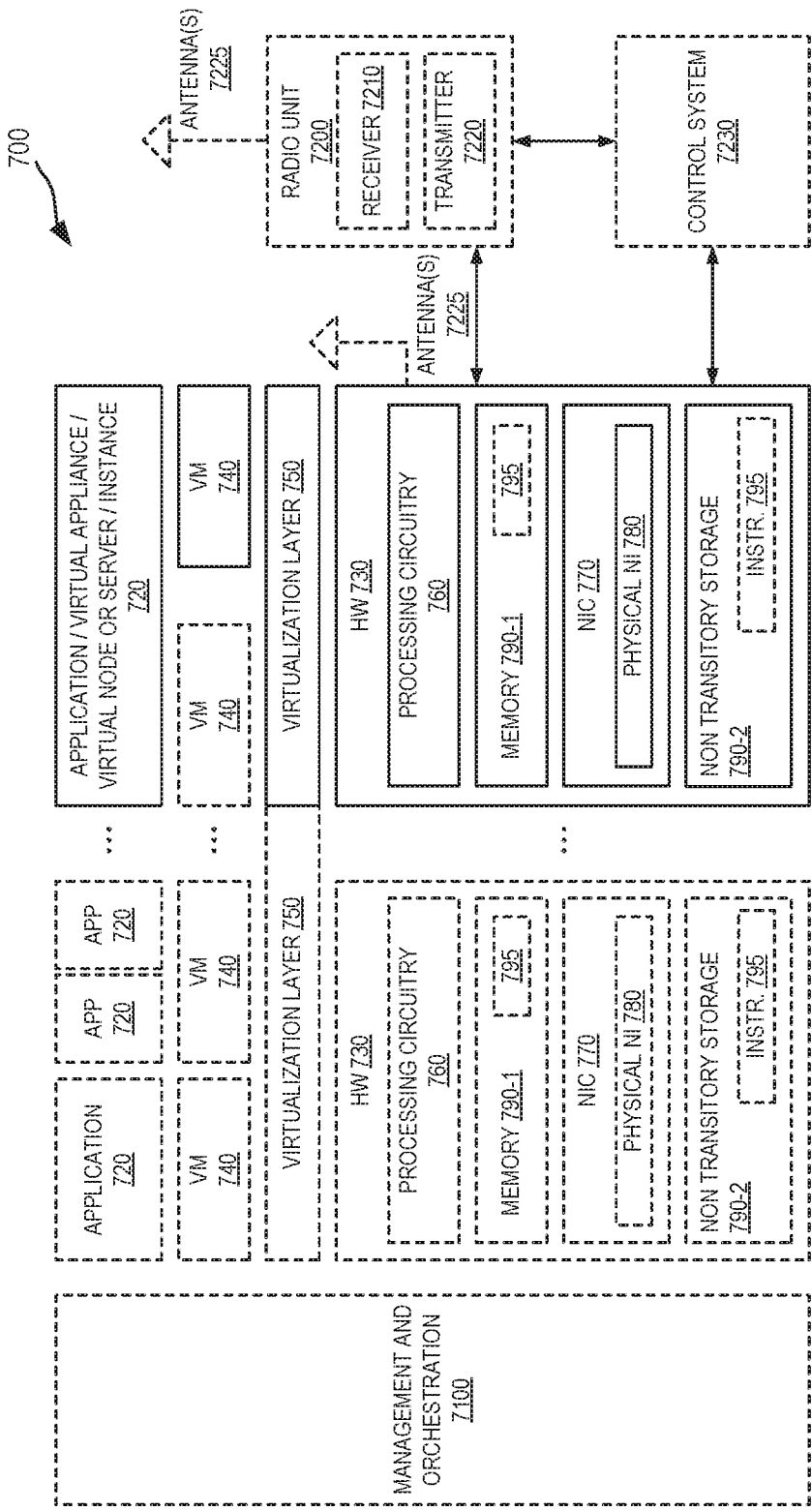
FIG. 7 illustrates a virtualization environment in accordance with some embodiments.

FIG. 7 is a schematic block diagram illustrating a virtualization environment 700 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 700 hosted by one or more of hardware nodes 730. Further, in embodiments in which the virtual node is not a radio access node or does not require radio connectivity (e.g., a core network node), then the network node may be entirely virtualized.

The functions may be implemented by one or more applications 720 (which may alternatively be called software instances, virtual appliances, network functions, virtual nodes, virtual network functions, etc.) operative to implement some of the features, functions, and/or benefits of some of the embodiments disclosed herein. Applications 720 are run in virtualization environment 700 which provides hardware 730 comprising processing circuitry 760 and memory 790. Memory 790 contains instructions 795 executable by processing circuitry 760 whereby application 720 is operative to provide one or more of the features, benefits, and/or functions disclosed herein.

Virtualization environment 700, comprises general-purpose or special-purpose network hardware devices 730 comprising a set of one or more processors or processing circuitry 760, which may be Commercial off-the-Shelf (COTS) processors, dedicated ASICs, or any other type of processing circuitry including digital or analog hardware components or special purpose processors. Each hardware device may comprise memory 790-1 which may be non-persistent memory for temporarily storing instructions 795 or software executed by processing circuitry 760. Each hardware device may comprise one or more Network Interface Controllers (NICs) 770, also known as network interface cards, which include physical network interface 780. Each hardware device may also include non-transitory, persistent, machine-readable storage media 790-2 having stored therein software 795 and/or instructions executable by processing circuitry 760. Software 795 may include any type of software including software for instantiating one or more virtualization layers 750 (also referred to as hypervisors), software to execute virtual machines 740 as well as software allowing it to execute functions, features, and/or benefits described in relation with some embodiments described herein.

Virtual machines 740, comprise virtual processing, virtual memory, virtual networking or interface and virtual storage, and may be run by a corresponding virtualization layer 750 or hypervisor. Different embodiments of the instance of virtual appliance 720 may be implemented on one or more of virtual machines 740, and the implementations may be made in different ways.

During operation, processing circuitry 760 executes software 795 to instantiate the hypervisor or virtualization layer 750, which may sometimes be referred to as a Virtual Machine Monitor (VMM). Virtualization layer 750 may present a virtual operating platform that appears like networking hardware to virtual machine 740.

As shown in FIG. 7, hardware 730 may be a standalone network node with generic or specific components. Hardware 730 may comprise antenna 7225 and may implement some functions via virtualization. Alternatively, hardware 730 may be part of a larger cluster of hardware (e.g., such as in a data center or CPE) where many hardware nodes work together and are managed via Management and Orchestration (MANO) 7100, which, among others, oversees lifecycle management of applications 720.

Virtualization of the hardware is in some contexts referred to as Network Function Virtualization (NFV). NFV may be used to consolidate many network equipment types onto industry standard high volume server hardware, physical switches, and physical storage, which can be located in data centers, and CPE.

In the context of NFV, virtual machine 740 may be a software implementation of a physical machine that runs programs as if they were executing on a physical, non-virtualized machine. Each of virtual machines 740, and that part of hardware 730 that executes that virtual machine, be it hardware dedicated to that virtual machine and/or hardware shared by that virtual machine with others of the virtual machines 740, forms a separate Virtual Network Element (VNE).

Still in the context of NFV, Virtual Network Function (VNF) is responsible for handling specific network functions that run in one or more virtual machines 740 on top of hardware networking infrastructure 730 and corresponds to application 720 in FIG. 7.

In some embodiments, one or more radio units 7200 that each include one or more transmitters 7220 and one or more receivers 7210 may be coupled to one or more antennas 7225. Radio units 7200 may communicate directly with hardware nodes 730 via one or more appropriate network interfaces and may be used in combination with the virtual components to provide a virtual node with radio capabilities, such as a radio access node or a base station.

In some embodiments, some signaling can be effected with the use of control system 7230 which may alternatively be used for communication between the hardware nodes 730 and radio units 7200.

Figure 8:
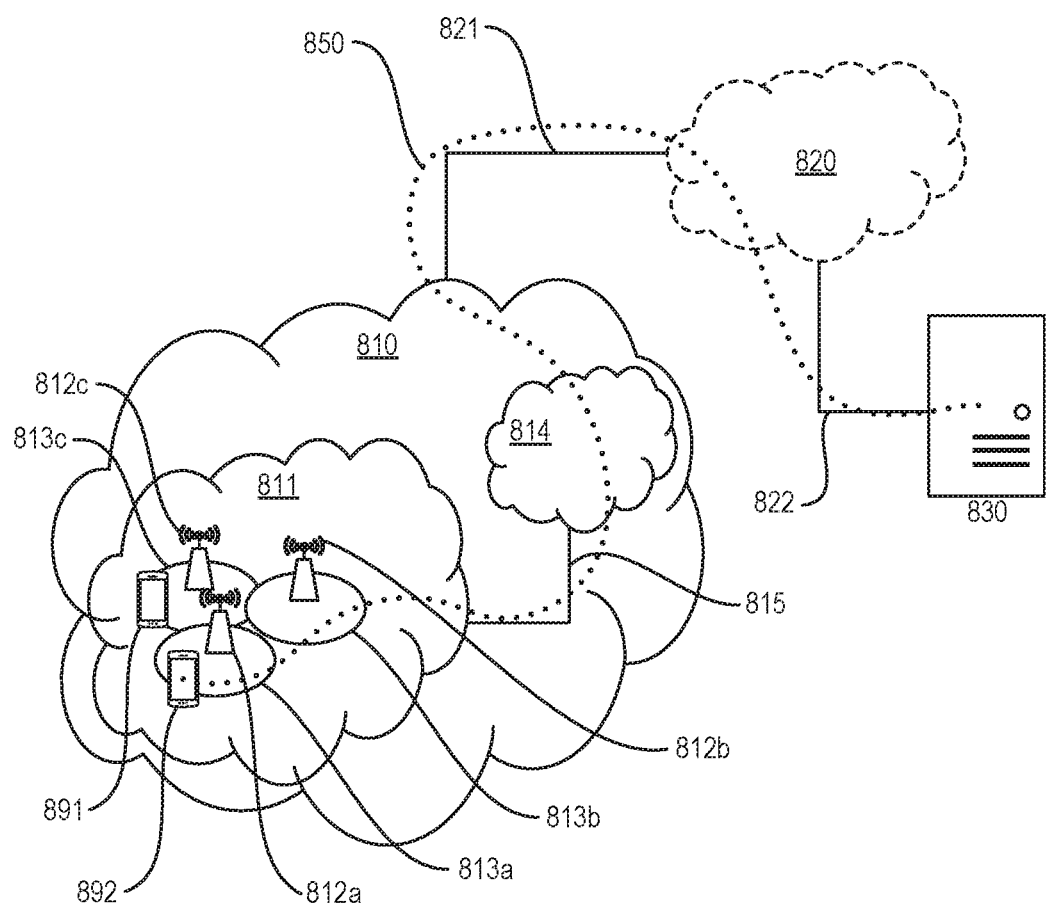
FIG. 8 illustrates a telecommunication network connected via an intermediate network to a host computer in accordance with some embodiments.

FIG. 8 illustrates a telecommunication network connected via an intermediate network to a host computer in accordance with some embodiments.

Referring to FIG. 8, in accordance with an embodiment, a communication system includes a telecommunication network 810, such as a 3GPP-type cellular network, which comprises access network 811, such as a radio access network, and core network 814. Access network 811 comprises a plurality of base stations 812a, 812b, 812c, such as Node Bs, eNBs, gNBs, or other types of wireless access points, each defining a corresponding coverage area 813a, 813b, 813c. Each base station 812a, 812b, 812c is connectable to core network 814 over a wired or wireless connection 815. A first UE 891 located in coverage area 813c is configured to wirelessly connect to, or be paged by, the corresponding base station 812c. A second UE 892 in coverage area 813a is wirelessly connectable to the corresponding base station 812a. While a plurality of UEs 891, 892 are illustrated in this example, the disclosed embodiments are equally applicable to a situation where a sole UE is in the coverage area or where a sole UE is connecting to the corresponding base station 812.

Telecommunication network 810 is itself connected to host computer 830, which may be embodied in the hardware and/or software of a standalone server, a cloud-implemented server, a distributed server, or as processing resources in a server farm. Host computer 830 may be under the ownership or control of a service provider, or may be operated by the service provider or on behalf of the service provider. Connections 821 and 822 between telecommunication network 810 and host computer 830 may extend directly from core network 814 to host computer 830 or may go via an optional intermediate network 820. Intermediate network 820 may be one of, or a combination of more than one of, a public, private, or hosted network; intermediate network 820, if any, may be a backbone network or the Internet; in particular, intermediate network 820 may comprise two or more sub-networks (not shown).

The communication system of FIG. 8 as a whole enables connectivity between the connected UEs 891, 892 and host computer 830. The connectivity may be described as an Over-the-Top (OTT) connection 850. Host computer 830 and the connected UEs 891, 892 are configured to communicate data and/or signaling via OTT connection 850, using access network 811, core network 814, any intermediate network 820 and possible further infrastructure (not shown) as intermediaries. OTT connection 850 may be transparent in the sense that the participating communication devices through which OTT connection 850 passes are unaware of routing of uplink and downlink communications. For example, base station 812 may not or need not be informed about the past routing of an incoming downlink communication with data originating from host computer 830 to be forwarded (e.g., handed over) to a connected UE 891. Similarly, base station 812 need not be aware of the future routing of an outgoing UL communication originating from the UE 891 towards the host computer 830.

Figure 9:
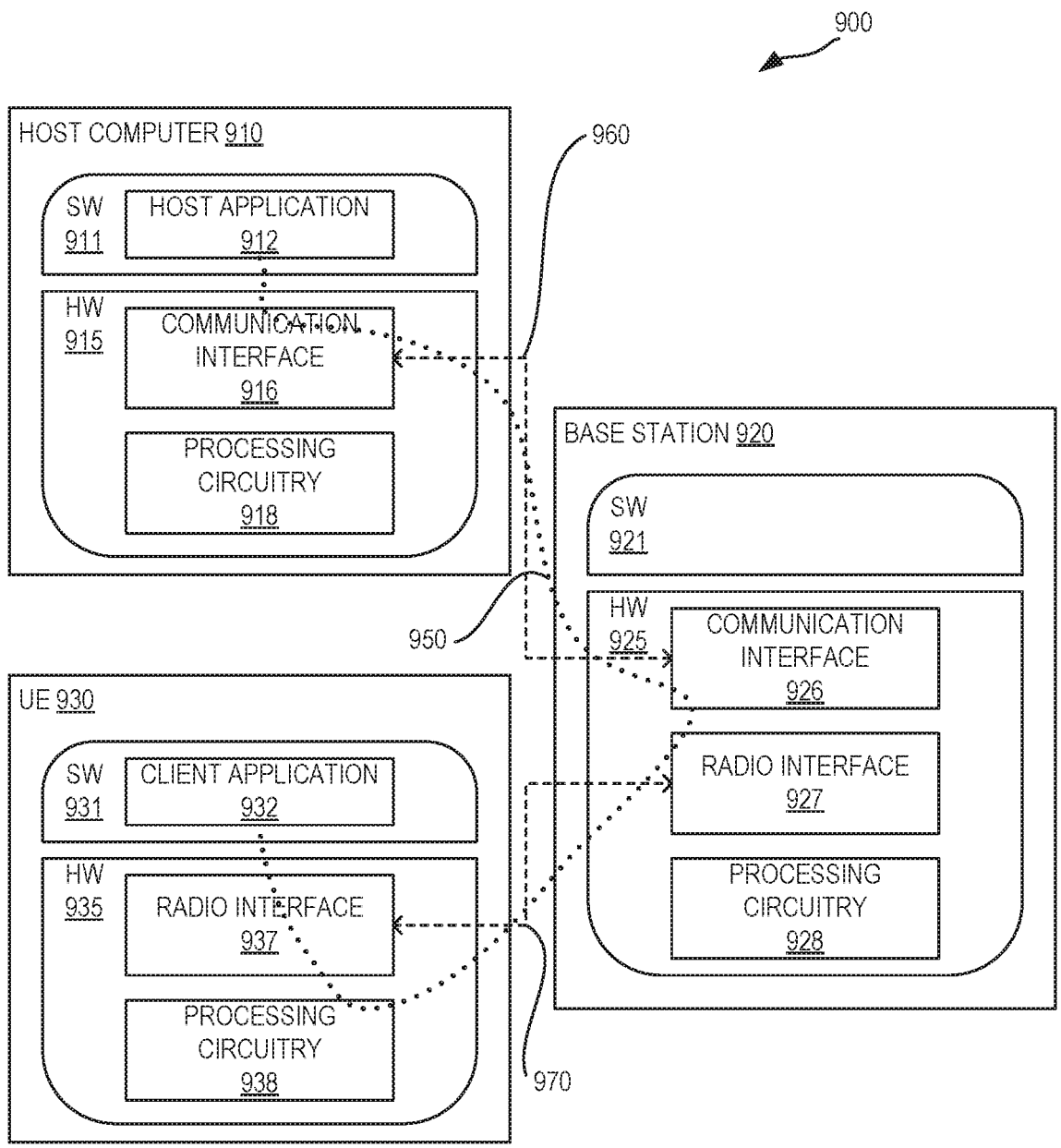
FIG. 9 illustrates a host computer communicating via a base station with a UE over a partially wireless connection in accordance with some embodiments.

FIG. 9 illustrates a host computer communicating via a base station with a user equipment over a partially wireless connection in accordance with some embodiments.

Example implementations, in accordance with an embodiment, of the UE, base station, and host computer discussed in the preceding paragraphs will now be described with reference to FIG. 9. In communication system 900, host computer 910 comprises hardware 915 including communication interface 916 configured to set up and maintain a wired or wireless connection with an interface of a different communication device of communication system 900. Host computer 910 further comprises processing circuitry 918, which may have storage and/or processing capabilities. In particular, processing circuitry 918 may comprise one or more programmable processors, ASICs, FPGAs, or combinations of these (not shown) adapted to execute instructions. Host computer 910 further comprises software 911, which is stored in or accessible by host computer 910 and executable by processing circuitry 918. Software 911 includes host application 912. Host application 912 may be operable to provide a service to a remote user, such as UE 930 connecting via OTT connection 950 terminating at UE 930 and host computer 910. In providing the service to the remote user, host application 912 may provide user data which is transmitted using OTT connection 950.

Communication system 900 further includes base station 920 provided in a telecommunication system and comprising hardware 925 enabling it to communicate with host computer 910 and with UE 930. Hardware 925 may include communication interface 926 for setting up and maintaining a wired or wireless connection with an interface of a different communication device of communication system 900, as well as radio interface 927 for setting up and maintaining at least wireless connection 970 with UE 930 located in a coverage area (not shown in FIG. 9) served by base station 920. Communication interface 926 may be configured to facilitate connection 960 to host computer 910. Connection 960 may be direct or it may pass through a core network (not shown in FIG. 9) of the telecommunication system and/or through one or more intermediate networks outside the telecommunication system. In the embodiment shown, hardware 925 of base station 920 further includes processing circuitry 928, which may comprise one or more programmable processors, ASICs, FPGAs, or combinations of these (not shown) adapted to execute instructions. Base station 920 further has software 921 stored internally or accessible via an external connection.

Communication system 900 further includes UE 930 already referred to. Its hardware 935 may include radio interface 937 configured to set up and maintain wireless connection 970 with a base station serving a coverage area in which UE 930 is currently located. Hardware 935 of UE 930 further includes processing circuitry 938, which may comprise one or more programmable processors, ASICs, FPGAs, or combinations of these (not shown) adapted to execute instructions. UE 930 further comprises software 931, which is stored in or accessible by UE 930 and executable by processing circuitry 938. Software 931 includes client application 932. Client application 932 may be operable to provide a service to a human or non-human user via UE 930, with the support of host computer 910. In host computer 910, an executing host application 912 may communicate with the executing client application 932 via OTT connection 950 terminating at UE 930 and host computer 910. In providing the service to the user, client application 932 may receive request data from host application 912 and provide user data in response to the request data. OTT connection 950 may transfer both the request data and the user data. Client application 932 may interact with the user to generate the user data that it provides.

It is noted that host computer 910, base station 920 and UE 930 illustrated in FIG. 9 may be similar or identical to host computer 830, one of base stations 812a, 812b, 812c and one of UEs 891, 892 of FIG. 8, respectively. This is to say, the inner workings of these entities may be as shown in FIG. 9 and independently, the surrounding network topology may be that of FIG. 8.

In FIG. 9, OTT connection 950 has been drawn abstractly to illustrate the communication between host computer 910 and UE 930 via base station 920, without explicit reference to any intermediary devices and the precise routing of messages via these devices. Network infrastructure may determine the routing, which it may be configured to hide from UE 930 or from the service provider operating host computer 910, or both. While OTT connection 950 is active, the network infrastructure may further take decisions by which it dynamically changes the routing (e.g., on the basis of load balancing consideration or reconfiguration of the network).

Wireless connection 970 between UE 930 and base station 920 is in accordance with the teachings of the embodiments described throughout this disclosure. One or more of the various embodiments improve the performance of OTT services provided to UE 930 using OTT connection 950, in which wireless connection 970 forms the last segment. For instance, certain embodiments may provide efficient transmission for both codebook based precoding as well as non-codebook based precoding. Some such embodiments enable (a) UEs transmitting with non-codebook based reciprocity to utilize full power for rank 1, or (b) UEs with non-coherent and partial coherent capabilities to transmit with full power for rank 1 and also enable the UEs to increase rank at the cost of lower power per layer. Such improvements may provide benefits such as increasing the quality or responsiveness of an OTT service.

A measurement procedure may be provided for the purpose of monitoring data rate, latency, and other factors on which the one or more embodiments improve. There may further be an optional network functionality for reconfiguring OTT connection 950 between host computer 910 and UE 930, in response to variations in the measurement results. The measurement procedure and/or the network functionality for reconfiguring OTT connection 950 may be implemented in software 911 and hardware 915 of host computer 910 or in software 931 and hardware 935 of UE 930, or both. In embodiments, sensors (not shown) may be deployed in or in association with communication devices through which OTT connection 950 passes; the sensors may participate in the measurement procedure by supplying values of the monitored quantities exemplified above, or supplying values of other physical quantities from which software 911, 931 may compute or estimate the monitored quantities. The reconfiguring of OTT connection 950 may include message format, retransmission settings, preferred routing etc.; the reconfiguring need not affect base station 920, and it may be unknown or imperceptible to base station 920. Such procedures and functionalities may be known and practiced in the art. In certain embodiments, measurements may involve proprietary UE signaling facilitating host computer 910's measurements of throughput, propagation times, latency, and the like. The measurements may be implemented in that software 911 and 931 causes messages to be transmitted, in particular empty or 'dummy' messages, using OTT connection 950 while it monitors propagation times, errors, etc.

Figure 10:
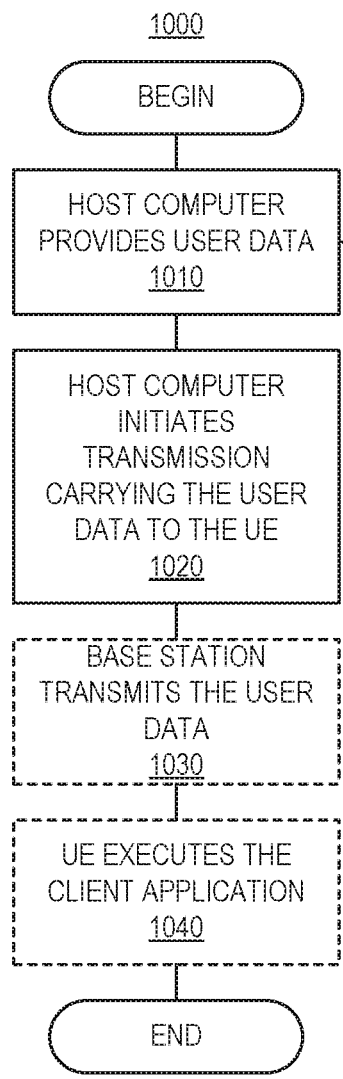
FIG. 10 illustrates methods implemented in a communication system including a host computer, a base station, and a UE in accordance with some embodiments.

FIG. 10 is a flowchart illustrating a method implemented in a communication system, in accordance with one embodiment. The communication system includes a host computer, a base station, and a UE which may be those described with reference to FIGS. 8 and 9. For the sake of brevity, only drawing references to FIG. 10 will be included in this section. In step 1010, the host computer provides user data. In substep 1011 (which may be optional) of step 1010, the host computer provides the user data by executing a host application. In step 1020, the host computer initiates a transmission carrying the user data to the UE. In step 1030 (which may be optional), the base station transmits to the UE the user data which was carried in the transmission that the host computer initiated, in accordance with the teachings of the embodiments described throughout this disclosure. In step 1040 (which may also be optional), the UE executes a client application associated with the host application executed by the host computer.

Figure 11:
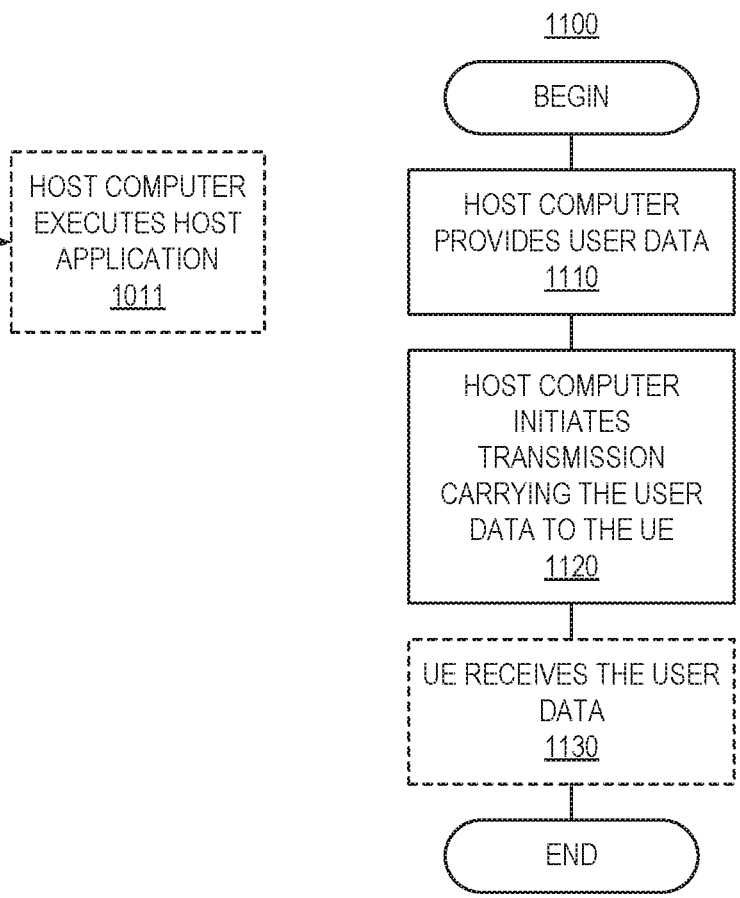
FIG. 11 illustrates methods implemented in a communication system including a host computer, a base station, and a UE in accordance with some embodiments.

FIG. 11 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 11 will be included in this section. In step 1110 of the method, the host computer provides user data. In an optional substep (not shown) the host computer provides the user data by executing a host application. In step 1120, the host computer initiates a transmission carrying the user data to the UE. The transmission may pass via the base station, in accordance with the teachings of the embodiments described throughout this disclosure. In step 1130 (which may be optional), the UE receives the user data carried in the transmission.

Figures 12, 13:
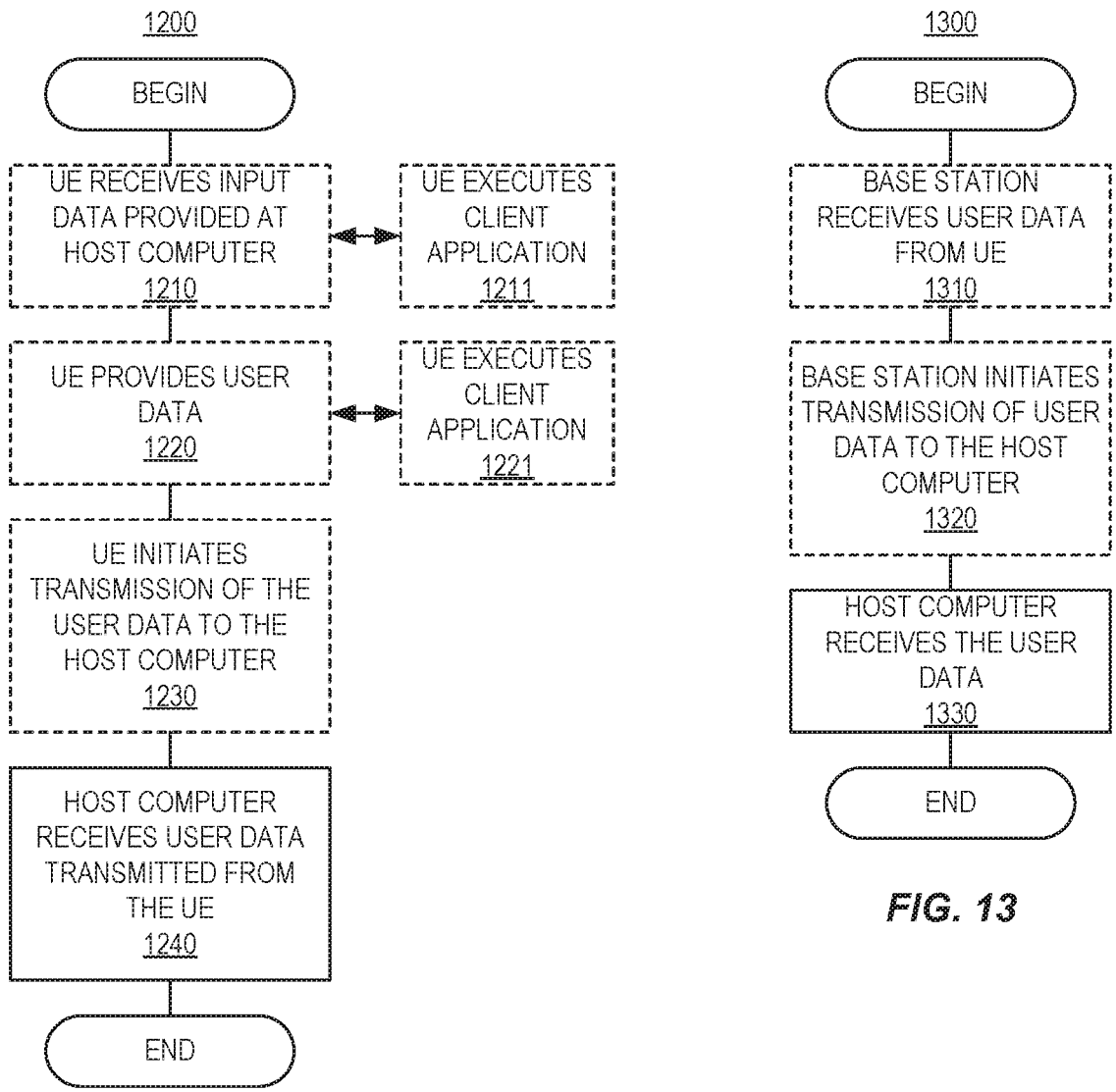
FIG. 12 illustrates methods implemented in a communication system including a host computer, a base station, and a UE in accordance with some embodiments.
FIG. 13 illustrates methods implemented in a communication system including a host computer, a base station, and a UE in accordance with some embodiments.

FIG. 12 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 12 will be included in this section. In step 1210 (which may be optional), the UE receives input data provided by the host computer. Additionally or alternatively, in step 1220, the UE provides user data. In substep 1221 (which may be optional) of step 1220, the UE provides the user data by executing a client application. In substep 1211 (which may be optional) of step 1210, the UE executes a client application which provides the user data in reaction to the received input data provided by the host computer. In providing the user data, the executed client application may further consider user input received from the user. Regardless of the specific manner in which the user data was provided, the UE initiates, in substep 1230 (which may be optional), transmission of the user data to the host computer. In step 1240 of the method, the host computer receives the user data transmitted from the UE, in accordance with the teachings of the embodiments described throughout this disclosure.

FIG. 13 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 13 will be included in this section. In step 1310 (which may be optional), in accordance with the teachings of the embodiments described throughout this disclosure, the base station receives user data from the UE. In step 1320 (which may be optional), the base station initiates transmission of the received user data to the host computer. In step 1330 (which may be optional), the host computer receives the user data carried in the transmission initiated by the base station.

Figure 15:
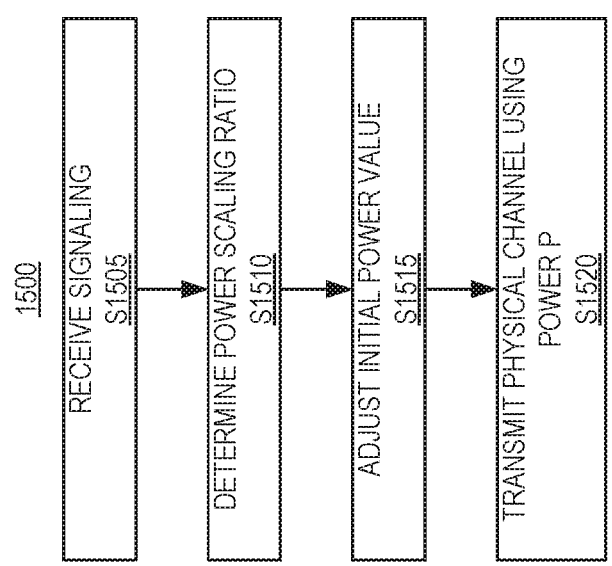
FIG. 15 illustrates a method in accordance with some embodiments.

FIG. 14 illustrates a schematic block diagram of an apparatus 1400 in a wireless network (for example, the wireless network shown in FIG. 5). The apparatus may be implemented in a wireless device or network node (e.g., wireless device 510 or network node 560 shown in FIG. 5). Apparatus 1400 is operable to carry out the example method described with reference to FIG. 15 and possibly any other processes or methods disclosed herein. It is also to be understood that the method of FIG. 15 is not necessarily carried out solely by apparatus 1400. At least some operations of the method can be performed by one or more other entities.

Virtual Apparatus 1400 may comprise processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as ROM, RAM, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause the units in apparatus 1400 to perform corresponding functions according one or more embodiments of the present disclosure.

As illustrated in FIG. 14, apparatus 1400 comprises receiving unit 1402, determining unit 1404, adjusting unit 1406, and transmitting unit 1408. These units are configured to perform corresponding operations performed by the method of FIG. 15.

The term "unit" may have conventional meaning in the field of electronics, electrical devices, and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

FIG. 15 illustrates a method according to some embodiments.

Referring to FIG. 15, the method may comprise receiving signaling identifying a multi-antenna transmission configuration (S1505), determining a power scaling ratio R, the ratio R being a first number antenna ports divided by a second number of antenna ports (S1510), wherein the first number of antenna ports is a number of antenna ports with NZP, and the second number of antenna ports being determined according to the multi-antenna transmission configuration as one of (a) a third number of ports used in a precoder indicated by a gNB, and (b) a fourth number of spatial layers indicated by the gNB, adjusting an initial power value P0 by at least the ratio R to determine P (S1515), and transmitting the physical channel using the power P (S1520).

Alternatively, the method may comprise receiving signaling identifying a first number of antenna ports on which the physical channel is to be transmitted and a multi-antenna transmission configuration, the multi-antenna configuration identifying if codebook based or non-codebook based transmission scheme is to be used (S1505), determining a power scaling ratio R according to the number of antenna ports, a second number of antenna ports, and at least one of the multi-antenna configuration and a UE coherence capability, where the second number of antenna ports is a number of antenna ports with NZP (S1510), adjusting an initial power value P0 by at least the ratio R to determine P (S1515), and transmitting the physical channel using the power P (S1520).

Figure 16:
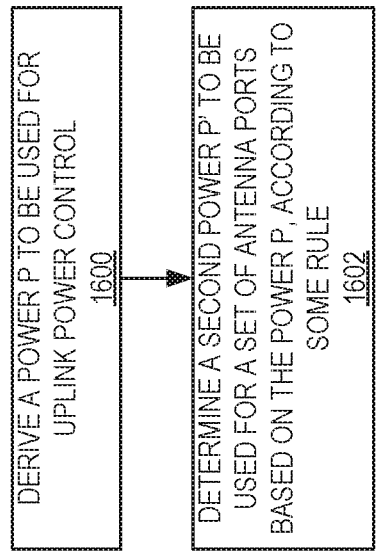
FIG. 16 illustrates a flow chart that illustrates the operation of a UE in accordance with some embodiments.

FIG. 16 is a flow chart that illustrates the operation of a UE in accordance with some embodiments of the present disclosure. As illustrated, the UE derives a power P to be used for UL power control (step 1600). As described herein, the UL power control is for a PUSCH transmission. The UE decides (or determines) a second power P' to be used for a set of antenna ports according to some rule (step 1602). This rule may be any of the rules described herein (e.g., any of the rules described above with respect to Embodiments 1 to 3). As described herein, in some embodiments, the rule is a rule that depends on whether the UE is utilizing codebook based transmission or non-codebook based transmission for the PUSCH transmission, where the set of antenna ports is antenna ports on which the PUSCH transmission is transmitted with NZP. As also described herein, in some embodiments, the rule is a rule that depends on a capability of the UE in terms of full coherence, partial coherence, or non-coherence transmission, where the set of antenna ports is antenna ports on which the PUSCH transmission is transmitted with NZP. Further details regarding these and additional embodiments are described above and therefore not repeated here.

Some selected embodiments of the present disclosure are as follows:

Embodiment 1

A method (1500) in a UE for determining a transmission power P for a physical channel configured for multi-antenna transmission, comprising: receiving signaling identifying a multi-antenna transmission configuration (S1505); determining a power scaling ratio R, the ratio R being a first number antenna ports divided by a second number of antenna ports (S1510), wherein the first number of antenna ports is a number of antenna ports with non-zero power, and the second number of antenna ports being determined according to the multi-antenna transmission configuration as one of (a) a third number of ports used in a precoder indicated by a gNB, and (b) a fourth number of spatial layers indicated by the gNB; adjusting an initial power value P0 by at least the ratio R to determine P (S1515); and transmitting the physical channel using the power P (S1520).

Embodiment 2

The method of embodiment 1, wherein the UE is configured to transmit the physical channel using a codebook, the codebook supports transmission on the second number of antenna ports and comprises at least a first and second precoder, the first precoder comprising elements with zero magnitude, and the second precoder comprising elements only of non-zero magnitude.

Embodiment 3

The method of any of embodiments 1-2, wherein the step of transmitting further comprises transmitting the physical channel using a plurality of antenna ports, wherein the power P is divided equally across a set of antenna ports, wherein each antenna port of the set transmits the physical channel using non-zero power.

Embodiment 4

The method of any of embodiments 1-3, wherein the multi-antenna transmission configuration identifies if a codebook based transmission or a non-codebook based transmission is to be used to transmit the physical channel, and the second number of antenna ports is determined as the fourth number of antenna ports if non-codebook based operation is to be used.

Embodiment 5

The method of any of embodiments 1-4 wherein non-codebook based transmission is to be used to transmit the physical channel, and the second number of antenna ports is determined as the fourth number of antenna ports according to if the UE is configured with a CSI-RS that is used to calculate precoding for the physical channel, and second number of antenna ports is determined as the third number of antenna ports otherwise.

Embodiment 6

The method of any of embodiments 1-5 wherein the multi-antenna transmission configuration identifies if the physical channel is to be transmitted according to a UE coherence capability, the capability comprising at least one of full-coherence, partial-coherence, or non-coherence.

Embodiment 7

A method (1500) in a UE for determining a transmission power P for a physical channel configured for multi-antenna transmission, comprising: receiving signaling identifying a first number of antenna ports on which the physical channel is to be transmitted and a multi-antenna transmission configuration, the multi-antenna configuration identifying if codebook based or non-codebook based transmission scheme is to be used (S1505); determining a power scaling ratio R according to the number of antenna ports, a second number of antenna ports, and at least one of the multi-antenna configuration and a UE coherence capability, where the second number of antenna ports is a number of antenna ports with non-zero power (S1510); adjusting an initial power value P0 by at least the ratio R to determine P (S1515); and transmitting the physical channel using the power P (S1520).

Embodiment 8

The method of embodiment 7, wherein R is selected from a set of predetermined values.

Embodiment 9

The method of any of embodiments 7-8, wherein R is the lesser of a first and a predetermined second value, the first value being calculated as a product of a scale factor and a ratio of the second number of antenna ports over the first number of antenna ports, wherein the scale factor is determined according to at least one of the multi-antenna configuration and the UE coherence capability.

Embodiment 10

The method of any of embodiments 7-9, wherein the UE is configured to transmit the physical channel using a codebook, the codebook supports transmission on the first number of antenna ports and comprises at least a first and second precoder, the first precoder comprising elements with zero magnitude, and the second precoder comprising elements only of non-zero magnitude.

Embodiment 11

The method of any of embodiments 7-10, wherein the step of transmitting further comprises transmitting the physical channel using a plurality of antenna ports, wherein the power P is divided equally across a set of antenna ports, wherein each antenna port of the set transmits the physical channel using non-zero power.

Embodiment 12

The method of any of embodiments 7-11, wherein the multi-antenna transmission configuration identifies if the physical channel is to be transmitted according to a UE coherence capability, the capability comprising at least one of full-coherence, partial-coherence, or non-coherence.

Embodiment 13

The method of any of embodiments 7-12, wherein the ratio R is at most one.

Embodiment 14

The method of any of embodiments 7-13, wherein the ratio R is less than one only when the multi-antenna configuration identifies codebook based transmission and one of the following combinations of conditions is met: (a) the UE coherence capability includes full coherence, the first number of antenna ports is 4, and the second number of antenna ports is 3 or less; (b) the UE coherence capability includes full coherence, the first number of antenna ports is 2, and the second number of antenna ports is 1; (c) the UE coherence capability does not include full coherence, does include partial coherence, the first number of antenna ports is 4, and the second number of antenna ports is 1.

Embodiment 15

A user equipment (UE) comprising processing circuitry configured to derive a power P to be used for UL power control, wherein the power P is used to decide the power to be used for a set of antenna ports, and the decision is determined according to some rule.

Embodiment 16

The UE of embodiment 15, wherein the rule derives a second power P' which is divided equally across the antenna ports transmitting a non-zero PUSCH.

Embodiment 17

The UE of any of embodiments 15-16, wherein said second power is derived by scaling said first power P with a ratio of the number of antenna ports with a non-zero PUSCH transmission to the number of antenna ports used for PUSCH transmission.

Embodiment 18

The UE of any of embodiments 15-17, wherein the rule depends on whether the UE is utilizing codebook based transmission or non-codebook based transmission for the PUSCH transmission.

Embodiment 19

The UE of any of embodiments 15-17, wherein the rule depends on the UE capability in terms of full-coherence, partial-coherence, or non-coherence.

Embodiment 20

The UE of any of embodiments 15-19, wherein the second power is derived by scaling the first power P with a ratio where said ratio is derived as a function depending on any one or more of the following: codebook based transmission or non-codebook based PUSCH transmission; the UE capability in terms of full-coherence, partial-coherence, or non-coherence; the number of antenna ports with a non-zero PUSCH transmission; the number of antenna ports used for the PUSCH transmission; and the number of antenna ports at the UE.

Embodiment 21

The UE of any of embodiments 15-20, wherein the rule is such that second power may be lower than said first power.

Embodiment 22

The UE of any of embodiments 15-21, wherein the rule is such that second power may equal the first power for rank 1 transmission for at least two of the UE capabilities, and/or for both codebook-based and non-codebook based transmission.

At least some of the following abbreviations may be used in this disclosure. If there is an inconsistency between abbreviations, preference should be given to how it is used above. If listed multiple times below, the first listing should be preferred over any subsequent listing(s).
2G Second Generation
3G Third Generation
3GPP Third Generation Partnership Project
4G Fourth Generation
AC Alternating Current
AP Access Point
ASIC Application Specific Integrated Circuit
ATM Asynchronous Transfer Mode
BS Base Station
BSC Base Station Controller
BTS Base Transceiver Station
CB Codebook Based User Equipment Capability
CD Compact Disk
CDMA Code Division Multiple Access
COTS Commercial off-the-Shelf
CPE Customer Premise Equipment
CP-OFDM Cyclic Prefix Orthogonal Frequency Division Multiplexing
CPU Central Processing Unit
CSI-RS Channel State Information Reference Signal
D2D Device-to-Device
DAS Distributed Antenna System
DC Direct Current
DIMM Dual In-Line Memory Module
DL Downlink
DSP Digital Signal Processor
DVD Digital Video Disk
EEPROM Electrically Erasable Programmable Read Only Memory
eMTC Enhanced Machine Type Communication
E-SMLC Evolved-Serving Mobile Location Centre
eNB Evolved Node B
EPROM Erasable Programmable Read Only Memory
FPGA Field Programmable Gate Array
GHz Gigahertz
gNB Base station in NR
GPS Global Positioning System
GSM Global System for Mobile Communications
HDDS Holographic Digital Data Storage
HD-DVD High-Density Digital Versatile Disc
I/O Input and Output
IoT Internet of Things
IP Internet Protocol
LAN Local Area Network
LEE Laptop Embedded Equipment LME Laptop-Mounted Equipment
LTE Long-Term Evolution
M2M Machine-to-Machine
MANO Management and Orchestration
MCE Multi-Cell/Multicast Coordination Entity
MCS Modulation and Coding State
MDT Minimization of Drive Tests
MHz Megahertz
MIMO Multiple-Input-Multiple-Output
mm Millimeter
MSR Multi-Standard Radio
MTC Machine Type Communication
NB-IoT Narrowband Internet of Things
NIC Network Interface Controller
NCB Non-Codebook Based User Equipment Capability
NFV Network Function Virtualization
NR New Radio
NZP Non-Zero Power
O&M Operation and Maintenance
OSS Operations Support System
OTT Over-the-Top
PA Power Amplifier
PC Power Control
PDA Personal Digital Assistant
PROM Programmable Read Only Memory
PSTN Public Switched Telephone Network
PUSCH Physical Uplink Shared Channel
RAID Redundant Array of Independent Disks
RAM Random Access Memory
RAN Radio Access Network
RAT Radio Access Technology
RF Radio Frequency
RNC Radio Network Controller
ROM Read Only Memory
RRH Remote Radio Head
RRU Remote Radio Unit
RUIM Removable User Identity
SDRAM Synchronous Dynamic Random Access Memory
SIM Subscriber Identity Module
SINR Signal to Interference plus Noise Ratio
SNR Signal to Noise Ratio
SOC System on a Chip
SON Self Optimized Network
SONET Synchronous Optical Networking
SRI Sounding Reference Signal Resource Indicator
SRS Sounding Reference Signal
TCP Transmission Control Protocol
TFRE Time/Frequency Resource Element
TPC Transmit Power Control
TPMI Transmit Precoder Matrix Indicator
TRI Transmission Rank Indicator
TRP Transmission Reception Point
TS Technical Specification
UE User Equipment
UL Uplink
UMTS Universal Mobile Telecommunication System
USB Universal Serial Bus
UTRAN Universal Terrestrial Radio Access Network
V2I Vehicle-to-Infrastructure
V2V Vehicle-to-Vehicle
V2X Vehicle-to-Everything
VMM Virtual Machine Monitor
VNE Virtual Network Element
VNF Virtual Network Function
VoIP Voice over Internet Protocol
WAN Wide Area Network
WCDMA Wideband Code Division Multiple Access
WD Wireless Device
WiMax Worldwide Interoperability for Microwave Access
WLAN Wide Local Area Network Those skilled in the art will recognize improvements and modifications to the embodiments of the present disclosure. All such improvements and modifications are considered within the scope of the concepts disclosed herein.

What is claimed is:

1. A User Equipment, UE, comprising:
processing circuitry configured to:
derive a power P to be used for uplink power control for a physical uplink shared channel transmission; and
determine a power scaling ratio to apply to the power P before splitting the scaled power P equally across a set of antenna ports on which the UE transmits the physical uplink shared channel transmission with non-zero power, the power scaling ratio being determined according to a rule that depends on which of two types of transmissions the UE is utilizing for the physical uplink shared channel transmission, the two types including codebook based transmission and non-codebook based transmission.

2. The UE of claim 1 wherein the UE further comprises an interface, and the processing circuitry is further configured to transmit, via the interface, the physical uplink shared channel transmission using the set of antenna ports.

3. The UE of claim 1 wherein the rule is such that, for a case of non-codebook based transmission, the power scaling ratio is 1.

4. The UE of claim 1 wherein the rule is such that, for a case of codebook based transmission, the power scaling ratio is a number of antenna ports on which the physical uplink shared channel transmission is transmitted with non-zero power divided by a number of antenna ports at the UE.

5. The UE of claim 4 wherein the number of antenna ports at the UE is the number of Sounding Reference Signal, SRS, ports in an SRS resource at the UE.

6. The UE of claim 4 wherein the ratio is derived by selecting the ratio from a set of predetermined values.

7. The UE of claim 1 wherein the rule is such that, in order to determine the power to be used for the set of antenna ports based on the power P according to the rule, the processing circuitry is further configured to:
derive a ratio $\alpha\_=K\, \rho\_0/\rho$ where $\rho$ is a number of antenna ports used for the physical uplink shared channel transmission, $\rho\_0$ is a number of antenna ports on which the physical uplink shared channel transmission is transmitted with non-zero power, and:
K=1 if the UE has full coherence transmission capability in case of codebook based transmission;
K=2 if the UE has partial coherence transmission capability in case of codebook based transmission with four antenna ports; and
K=2 or K=4 if the UE has non-coherence transmission capability in case of codebook based transmission and two or four antenna ports, respectively;
derive a second power P' by scaling the power P with a ratio $\beta=\min\{1,\alpha\}$; and
equally divide the second power P' across the set of antenna ports on which the physical uplink shared channel transmission is transmitted with non-zero power.

8. A method implemented in a User Equipment, UE, the method comprising:
- deriving a power P to be used for uplink power control for a physical uplink shared channel transmission; and
- determining a power scaling ratio to apply to the power P before splitting the scaled power P equally across a set of antenna ports on which the UE transmits the physical uplink shared channel transmission with non-zero power, the power scaling ratio being determined according to a rule that depends on which of two types of transmissions the UE is utilizing for the physical uplink shared channel transmission, the two types including codebook based transmission and non-codebook based transmission.

9. The method of claim 8 further comprising transmitting the physical uplink shared channel transmission using the set of antenna ports.

10. The method of claim 8 wherein the rule is such that, for a case of non-codebook based transmission, the power scaling ratio is 1.

11. The method of claim 8 wherein the rule is such that, for a case of codebook based transmission, the power scaling ratio is a number of antenna ports on which the physical uplink shared channel transmission is transmitted with non-zero power divided by a number of antenna ports at the UE.

12. The method of claim 11 wherein the number of antenna ports at the UE is the number of Sounding Reference Signal, SRS, ports in an SRS resource at the UE.

13. The method of claim 8 wherein the rule is such that determining the power scaling ratio to apply to the power P according to the rule comprises:
- deriving a ratio $\alpha\_ = K\, \rho\_0/\rho$ where $\rho$ is a number of antenna ports used for the physical uplink shared channel transmission, $\rho\_0$ is a number of antenna ports on which the physical uplink shared channel transmission is transmitted with non-zero power, and:
  - K=1 if the UE has full coherence transmission capability in case of codebook based transmission;
  - K=2 if the UE has partial coherence transmission capability in case of codebook based transmission with four antenna ports; and
  - K=2 or K=4 if the UE has non-coherence transmission capability in case of codebook based transmission and two or four antenna ports, respectively;
- deriving a second power P' by scaling the power P with a ratio $\beta = \min\{1, \alpha\}$; and
- equally dividing the second power P' across the set of antenna ports on which the physical uplink shared channel transmission is transmitted with non-zero power.

14. The method of claim 8 wherein the power scaling ratio is derived as a function depending on a capability of the UE in terms of full coherence, partial coherence, or non-coherence transmission;
- a number of antenna ports, in the set of antenna ports, on which a non-zero physical uplink shared channel is transmitted;
- a number of antenna ports, in the set of antenna ports, used for the physical uplink shared channel transmission; and/or
- a number of antenna ports, in the set of antenna ports, at the UE.

15. A method implemented in a User Equipment, UE, the method comprising:
- deriving a power P to be used for uplink power control for a physical uplink shared channel transmission;
- determining a power to be used for a set of antenna ports based on the power P according to a rule that depends on a capability of the UE in terms of full coherence, partial coherence, or non-coherence transmission, the set of antenna ports being antenna ports on which the physical uplink shared channel transmission is transmitted with non-zero power; and
- equally dividing the determined power across the set of antenna ports on which the physical uplink shared channel transmission is transmitted with non-zero power,
- wherein determining the power to be used for the set of antenna ports based on the power P further includes scaling the power P by a ratio that is determined in dependence on which of two types of transmissions the UE is utilizing for the physical uplink shared channel transmission, the two types including codebook based transmission and non-codebook based transmission.

16. The method of claim 15 wherein, for a case of codebook based transmission, scaling the power P by a ratio comprises:
- scaling the power P with a ratio of a number of antenna ports on which the physical uplink shared channel transmission is transmitted with non-zero power to a number of antenna ports at the UE.

* * * * *

UNITED STATES PATENT AND TRADEMARK OFFICE
CERTIFICATE OF CORRECTION

PATENT NO. : 11,695,458 B2
APPLICATION NO. : 16/653402
DATED : July 4, 2023
INVENTOR(S) : Wernersson et al.

Page 1 of 2

It is certified that error appears in the above-identified patent and that said Letters Patent is hereby corrected as shown below:

In the Specification

In Column 1, Line 9, delete "2019," and insert -- 2019, now U.S. Pat. No. 10,476,567, --, therefor.

In Column 2, Line 50, delete "State" and insert -- Scheme --, therefor.

In Column 4, Line 52, delete "supporting and" and insert -- supporting --, therefor.

In Column 5, Line 7, delete "$M_{symb}^{ab}$" and insert -- $M_{symb}^{ap}$ --, therefor.

In Column 5, Line 11, delete "matrix w" and insert -- matrix W --, therefor.

In Column 5, Line 12, delete "matrix w" and insert -- matrix W --, therefor.

In Column 5, Line 13, delete "w=1" and insert -- W=1 --, therefor.

In Column 5, Line 50, delete "$P_{PUSCH, f, c}$ (i, j, $q_d$, l)" and insert -- $P_{PUSCH, f, c}$(i, j, $q_d$, l) --, therefor.

In Column 7, Line 10, delete "β=min {1, α}" and insert -- β=min{1, α} --, therefor.

In Column 13, Line 10, delete "$P_{PUSCH, f, c}$ (i, j, $q_d$, l)" and insert -- $P_{PUSCH, f, c}$(i, j, $q_d$, l) --, therefor.

In Column 14, Line 66, delete "$v_{१.}$" and insert -- $v_{i.}$ --, therefor.

In Columns 15 & 16, in Table, Line 4, delete "v150.0)" and insert -- v15.0.0) --, therefor.

In Columns 15 & 16, in Table, Line 7, delete "*sqrt(P / 4)\**" and insert -- *sqrt(P/4)\** --, therefor.

In Column 17, Line 44, delete "{$p_0$, . . . , $p_{p-1}$}" and insert -- {$p_0$, . . . , $p_{P-1}$} --, therefor.

Signed and Sealed this
Twenty-third Day of January, 2024

*Katherine Kelly Vidal*

Katherine Kelly Vidal
*Director of the United States Patent and Trademark Office*

CERTIFICATE OF CORRECTION (continued)
U.S. Pat. No. 11,695,458 B2

In Column 17, Line 51, delete "$P_{PUSCH, f, c}(i, j, q_d, l)$" and insert -- $P_{PUSCH, f, c}(i, j, q_d, l)$ --, therefor.

In Column 18, Line 48, delete "p" and insert -- $\rho$ --, therefor.

In Column 18, Line 60, delete "$\alpha=K\rho/\rho_0$" and insert -- $\alpha=K\rho_0/\rho$ --, therefor.

In Column 18, Line 65, delete "$q_c$," and insert -- $q_d$, --, therefor.

In Column 18, Line 67, delete "C," and insert -- c, --, therefor.

In Column 19, Line 44, delete "C," and insert -- c, --, therefor.

In Column 19, Line 60, delete "6.3.1.5" and insert -- 6.3.1.5. --, therefor.

In Column 32, Lines 43-44, delete "memory 790. Memory 790" and insert -- memory 790-1. Memory 790-1 --, therefor.

In Column 42, Line 2, below "4G Fourth Generation", insert -- 5G Fifth Generation --, therefor.

In Column 43, Line 6, delete "State" and insert -- Scheme --, therefor.

In Column 43, Line 37, delete "Identity" and insert -- Identity Module --, therefor.

In the Claims

In Column 44, Lines 46-47, in Claim 7, delete "the power to be used for the set of antenna ports based on the power P" and insert -- the power scaling ratio to apply to the power P --, therefor.